United States Patent
Okada et al.

(10) Patent No.: US 7,545,485 B2
(45) Date of Patent: Jun. 9, 2009

(54) LASER RADAR APPARATUS THAT MEASURES DIRECTION AND DISTANCE OF AN OBJECT

(75) Inventors: Masanori Okada, Kariya (JP); Koji Konosu, Kariya (JP); Hideyuki Tanaka, Toyoake (JP)

(73) Assignee: Denso Wave Incorporated, Tokyo (JP)

( * ) Notice: Subject to any disclaimer, the term of this patent is extended or adjusted under 35 U.S.C. 154(b) by 0 days.

(21) Appl. No.: 12/068,258

(22) Filed: Feb. 5, 2008

(65) Prior Publication Data
US 2009/0122294 A1 May 14, 2009

(30) Foreign Application Priority Data
Nov. 12, 2007 (JP) .............................. 2007-293224

(51) Int. Cl.
*G01C 3/08* (2006.01)
(52) U.S. Cl. ..................................... 356/4.01; 356/5.01
(58) Field of Classification Search ................ 356/4.01, 356/5.01, 28
See application file for complete search history.

(56) References Cited

U.S. PATENT DOCUMENTS

| | | | | |
|---|---|---|---|---|
| 5,808,727 A | * | 9/1998 | Katayama | 356/4.01 |
| 6,265,725 B1 | * | 7/2001 | Moll et al. | 250/559.38 |
| 7,030,968 B2 | * | 4/2006 | D'Aligny et al. | 356/5.01 |
| 7,403,269 B2 | * | 7/2008 | Yamashita et al. | 356/5.01 |
| 7,443,555 B2 | * | 10/2008 | Blug et al. | 359/196 |
| 7,480,031 B2 | * | 1/2009 | Mack | 356/5.01 |
| 2005/0024625 A1 | * | 2/2005 | Mori et al. | 356/4.01 |

FOREIGN PATENT DOCUMENTS

JP    A-H03-175390    7/1991

* cited by examiner

*Primary Examiner*—Isam Alsomiri
(74) *Attorney, Agent, or Firm*—Posz Law Group, PLC

(57) ABSTRACT

There is provided a laser radar apparatus including laser beam generating means, photo detecting means, a mirror assembly, light deflecting means, and rotation driving means. The laser beam generating means emits a laser beam having an axis thereof. The photo detecting means detects a reflected laser beam that is reflected back by an object. The mirror assembly includes a through-hole that transmits the laser beam and a reflecting surface that reflects a reflected laser beam reflected back by the object toward the photo detecting means. The light deflecting means has a flat mirror surface and a concave-shaped mirror surface, and reflects the laser beam toward a measurement range and deflects the reflected laser beam from the object toward the mirror assembly. The rotation driving means rotates the light deflecting means so as to direct the laser beam toward the measurement range.

9 Claims, 11 Drawing Sheets

COMPARATIVE ART

LASER RADAR APPARATUS THAT MEASURES DIRECTION AND DISTANCE OF AN OBJECT

CROSS REFERENCE TO RELATED APPLICATION

The present application relates to and incorporated by reference Japanese Patent Applications 2007-293224 filed on Nov. 12, 2007.

BACKGROUND OF THE INVENTION

1. The Field of the Invention

The invention relates to a laser radar apparatus capable of measuring both the direction of an object and the distance to an object from the apparatus using laser beam.

2. Description of the Prior Art

As laser radar apparatus capable of measuring both the direction of an object and the distance to an object from the apparatus, there is a known apparatus such as disclosed by Hoashi et al. in Japanese Patent No. 2789741.

The laser radar apparatus of Hoashi et al. includes a laser beam generating means for emitting a laser beam or a laser pulse serving as an outgoing light into a measurement range, the outgoing light having an optical axis thereof, a photo detecting means for detecting the reflected laser beam or the reflected laser pulse that arrives after the outgoing light is reflected by an object located in the measurement range and serves as an incoming light, an optical isolator that allows the outgoing light to transmit therethrough and forbids the incoming light to transmit, and an electric control unit (ECU). The laser beam generating means is, for example, a laser diode that produces laser emission including a laser beam or laser pulse. The photo detecting means is, for example, a photo diode that converts an incident laser beam or an incident laser pulse to an electric current that is a function of the incident laser beam or the incident laser pulse. The optical isolator reflects the incoming light, and the incoming light by the optical isolator will be directed to the photo detecting means. In order to realize these functions, it is preferable that the optical isolator is located on the optical axis of the outgoing light. The electric control unit (ECU) calculates the distance from the apparatus to the object, if it exists, based on the difference in the phases of the outgoing and incoming laser beams, or the time of flight between the emission and reception of the laser pulse utilizing the speed of light. Further, the laser radar apparatus of Hoashi et al. includes a concave mirror that deflects the outgoing light toward the measurement range and the incoming light reflected back by the object toward the photo detecting means. Further the concave mirror is arranged to rotate up to 360 degrees around the axis so that an angular scanning range in the horizontal direction can be realized of up to 360 degrees. It should be noted that in the optical laser apparatus of Hoashi et al., a projection optical system includes the laser beam generating means, the optical isolator, and the concave mirror, and a photo detecting system includes the concave mirror and the optical isolator. The projection optical system and the photo detecting means are arranged coaxially in part. In more detail, the axes of the outgoing light and the incoming light between the optical isolator and the object are identical.

As described above, in the laser radar apparatus of Hoashi et al. or a laser radar apparatus of similar type, the axes of the outgoing light and the incoming light are identical, and the optical isolator is arranged to be located on the common axis to the outgoing light and the incoming light. The outgoing light emitted by the laser beam generating means transmits the optical isolator although the incoming light reflected back by the object is reflected by the optical isolator. In general, attenuation of the laser beam or the laser pulse may be caused during both the transmission and the reflection of the laser beam through and from the optical isolator, respectively. Hence, a large loss of the beam splitting efficiency is caused during the transmission and the reflection of the laser beam or the laser pulse through and from the optical isolator. This leads to a special configuration of some elements of the laser radar apparatus, for example, a bigger mirror having a larger mirror plate to enlarge the effective photo-receiving area so as to improve the beam splitting efficiency. This conflicts with the tendency of downsizing of the apparatus.

Further, as in the case of the laser radar apparatus of Hoashi et al. or a laser radar apparatus of similar type where the outgoing light is deflected toward the measurement range by the concave mirror, a diffusion of the outgoing light can not be prevented after the outgoing light is deflected by the concave mirror due to the concaved-shape of the concave mirror. In particular, if axis of the outgoing light emitted from the laser beam generating means is slightly deviated from the correct position or tilted from the correct direction before the outgoing light enters to the concave mirror, the situation will worsen due to the deflection by the concave mirror. The diffusion of the outgoing light due to the deflection by the concave mirror reduces the measurable range of the distance of the object from the apparatus. Thus, the laser radar apparatus of Hoashi et al. or a laser radar apparatus of similar type cannot ensure the accurate measurement of the distance of the object, in particular an object located far from the apparatus.

SUMMARY OF THE INVENTION

It is an object of the present invention to provide a laser radar apparatus that has an improved beam splitting efficiency and an improved accuracy of detecting the direction of an object and the distance to the object from the apparatus without sacrificing the small size of the laser radar apparatus due to the coaxial structure of the projection optical system and the photo detecting system.

According to an aspect of the present invention, a laser radar apparatus measures the distance and the direction to the object, the object being located in a measurement range from the laser radar apparatus, comprises laser beam generating means, photo detecting means, a mirror assembly, light deflecting means, and rotation driving means. The laser beam generating means generates a laser beam having an axis thereof and emitting the laser beam toward the measurement range. The photo detecting means detects a reflected laser beam that is reflected back by the object located in the measurement range. The mirror assembly further comprises a through-hole and a reflecting surface. The through-hole pierces the mirror assembly being coaxial with the axis of the laser beam emitted from the laser beam generating means and transmits the laser beam emitted from the laser beam generating means. The reflecting surface is arranged to be to a predetermined angle with the axis of the laser beam emitted from the laser beam generating means and reflects a reflected laser beam reflected back by the object toward the photo detecting means. The light deflecting means deflects the laser beam emitted from the laser beam generating means toward the measurement range, and deflects the reflected laser beam reflected back by the object located in the measurement range toward the laser beam isolating means. The light deflecting means has a rotation axis thereof, and a mirror surface including a flat reflecting portion having a flat mirror surface and a concave reflecting portion having a concave-shaped mirror surface. The mirror surface further has a focal point at which the laser beam meets after the reflected laser beam reflected back by the object is reflected by the mirror surface of the light deflecting means. The rotation driving means rotates the light deflecting means around the rotation axis of the light deflecting means such that both the concave-shaped mirror surface of the concave reflecting portion and the flat mirror surface of the flat reflecting portion of the light deflecting means are turned to be in the direction of the measurement range. Further, the focal point of laser the light deflecting means is located on the rotation axis of the light deflecting means, and the light deflecting means deflects the laser beam emitted from the laser beam generating means toward the measurement range and deflects the reflected laser beam reflected back by the object located in the measurement range toward the mirror assembly.

According to another aspect of the present invention, a laser radar apparatus that measures the distance and direction of an object which is located in a measurement range from the laser radar apparatus further comprises laser beam collecting means for collecting the reflected laser beam reflected back by the object to the photo detecting means in addition to the laser beam generating means, the photo detecting means, the mirror assembly having the through-hole and the reflecting surface, the light deflecting means, and the rotation driving means.

According to another aspect of the present invention, a laser radar apparatus that measures the distance and direction of an object which is located in a measurement range from the laser radar apparatus further comprise beam transforming means for transforming the laser beam emitted from the laser beam generating means to a transferred laser beam having a predetermined projection pattern in addition to the laser beam generating means, the photo detecting means, the mirror assembly having the through-hole and the reflecting surface, the light deflecting means, and the rotation driving means. The beam transforming means is embedded in the flat mirror surface portion of the surface of the light deflecting means such that the laser beam emitted from the laser beam generating means is transformed to have a predetermined projection pattern in the measurement range and the cross section of the transformed laser beam covers larger area than the cross sectional area of the laser beam emitted from the laser beam generating means.

According to another aspect of the present invention, a method for measuring the distance of an object and the direction to the object located in a measurement range from the laser radar apparatus, includes steps of: generating a laser beam having an axis thereof and emitting the laser beam toward the measurement range; splitting the laser beam into the first laser beam that is directed to the measuring range and the second laser beam that is directed to the photo detecting means; detecting the second laser beam by the photo detecting means to estimate the quantity of the second laser beam; estimating output power of the laser beam generating mean based on the intensity of the second laser beam; comparing the estimated output power of the laser beam generating mean with a reference value; adjusting the output power of the laser beam generating means according to the comparison; reflecting the reflected first laser beam from the object by the reflecting surface of the mirror assembly toward the photo detecting means; deflecting the first laser beam toward the measuring range by a flat mirror; deflecting the reflected laser beam from the object toward the photo detecting means by a concave-shaped mirror; and detecting the reflected first laser beam from the object by the photo detecting means; and calculating the distance from the apparatus to the object based on the difference of the phases of the outgoing and incoming laser beams or the time of flight between the emission and reception of the laser beam utilizing the speed of light.

BRIEF DESCRIPTION OF THE DRAWINGS

The present invention will be understood more fully from the detailed description to be given hereinbelow and from the accompanying drawings of the preferred embodiment of the invention, which is not taken to limit the invention to the specific embodiments but should be recognized for the purpose of explanation and understanding only.

In the drawings.

DETAILED DESCRIPTION OF PREFERRED EMBODIMENTS

Figure 1:
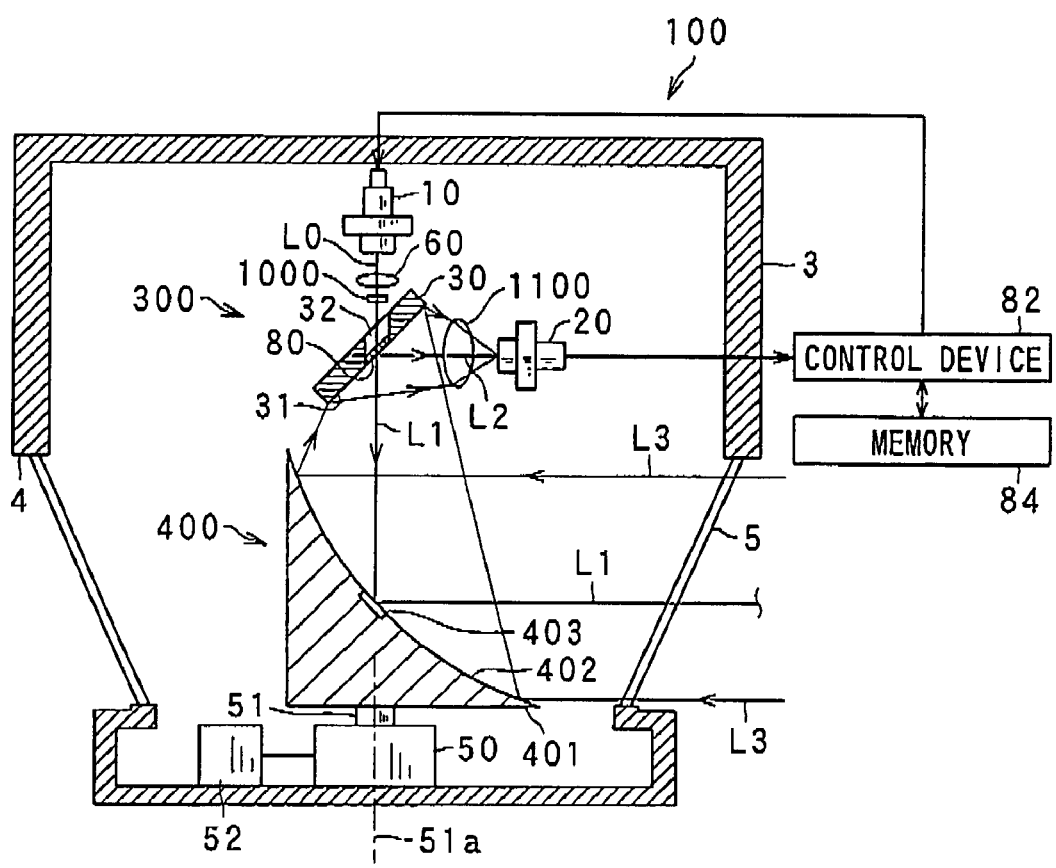
FIG. 1 is a schematic view of a laser radar apparatus according to a first embodiment of the present invention.

Preferred embodiments of the present invention will be explained below with reference to attached drawings. Identical constituents are denoted by the same reference numerals throughout the drawings.

First Embodiment

Referring to FIGS. 1-7, a laser radar apparatus according to a first embodiment of the present invention will be described.

FIG. 1 is a schematic view of the laser radar apparatus 100 according to the first embodiment of the present invention.

As shown in FIG. 1, the laser radar apparatus 100 including a laser diode 10 and a photo diode 20 is designed to detect the direction to an object located in a measurement range, if it exists, and the distance of the object from the apparatus based on the difference of the phases of an outgoing light L0 emitted by the laser diode 10 and an incoming light L3 that is reflected back by the object and received by the photo diode 20, or the time of flight between the emission of an outgoing light L0 and reception of an incoming light L3 utilizing the speed of light. In this embodiment, the laser diode 10 emits a laser pulse.

The laser diode 10 emits a laser pulse having an axis thereof as an outgoing laser beam L0 into a measurement range in response to a command signal from a laser diode controlling block which is not shown in FIG. 1. Laser beam generating means is constituted of the laser diode 10, a control device 82, and a memory 84. The control device 82 and the memory 84 controls operation of the laser diode 10 by sending a command signal to the laser diode 10. In the present case where the laser pulses are emitted from the laser diode 10, the command signal contains electric current pulse signals.

The photo diode 20 corresponds to a photo detecting means. The outgoing laser beam L0 is reflected the object located in the measurement range to form a reflected laser beam or incoming laser beam L3. Then, the reflected laser beam L3 is detected by the photo diode 20 and is converted to an electric signal whose amplitude is a function of an intensity of the reflected laser beam L3. In this embodiment, only a part of laser beam reflected by the object, the part of laser beam having an angle of reflection at a surface of the object nearly 0 degrees can return to the laser radar apparatus, as shown by parallel lines L3 in FIG. 1. The remaining part of the laser beam reflected by the object cannot be detected because of deviation from 0 degree in the angle of reflection at the surface of the object.

The laser radar apparatus 100 further includes an optical lens 60 and a mirror assembly 300. Both the optical lens 60 and the mirror assembly 300 are arranged to be coaxial with the axis of outgoing laser beam L0.

The optical lens 60 is of a type of collimating lens that transforms the emitted laser beam L0 from the laser diode 10 to a laser pulse of parallel rays. The optical lens 60 corresponds to laser beam collimating means.

In the present embodiment, the mirror assembly 300 includes a mirror 30 and a half-silvered mirror 80. The mirror 30 is substantially formed as a plate having two surfaces. The mirror 30 has a reflection plane 31 which corresponds to one of the surfaces of the mirror 30 and a through-hole 32. The reflection plane 31 is arranged at predetermined angle to the axis of outgoing laser beam L0. The through-hole 32 has a center axis thereof and pierces the mirror 30 such that the center axis of the through-hole 32 crosses a surface of the reflection plate 31. The laser radar apparatus 100 according to the present invention is arranged such that the outgoing laser beam L0 and the incoming laser beam L3 are coaxial. The mirror 30 is arranged such that the outgoing laser beam L0 passes through the through-hole 32. Thus, the outgoing laser beam L0 passes through the mirror 30, although the incoming laser beam L3 is deflected by the mirror 30. The through-hole 32 and the outgoing laser beam L0 have a common axis. Further the reflection plate 31 of the mirror 30 deflects the incoming laser beam L3 so as to direct it to the photo diode 20.

The half-silvered mirror 80 serves as the beam splitting means. The half-silvered mirror 80 is arranged to be coaxial with the axis of the outgoing laser beam L0, i.e, with the axis of the through-hole 32. The half-silvered mirror 80 splits the outgoing laser beam L0 into a first outgoing laser beam L1 and a second outgoing laser beam L2. The directions of the first outgoing laser beam L1 and the second outgoing laser beam L2 are different from each other. After the outgoing laser beam L0 is split by the half-silvered mirror 80, the first outgoing laser beam L1 enters to the concave mirror 401.

The mirror assembly 300 corresponds to laser beam isolating means.

The laser radar apparatus 100 according to the present embodiment further includes a rotary device 400. The rotary device 400 is arranged to be rotatable around a rotation axis which is the axis of the outgoing laser beam L0 so that an angular scanning range in the horizontal direction can be realized to be of up to 360 degrees. The rotary device 400 includes a concave mirror 401 that deflects the outgoing laser beam L0 toward the measurement range and the incoming laser beam L3 reflected back by the object toward the mirror 30. The concave mirror 401 has a focal point on the rotation axis of the rotary device 400. The rotary device 400 is an example of a device having a concave shaped surface. The rotation angle of the rotary device 400 determines the direction of the object to be detected. The concave mirror 401 corresponds to light deflecting means that includes the object having the concave shaped surface. The detailed structure of the concave mirror 401 will be explained later.

In order to drive the rotary device 400 to execute a continuous rotating movement, a motor 50 is provided. The motor 50 has an output shaft 51 that drives the rotary device 400 and the concave mirror 401. The motor 50 is an example of a rotation driving means. A stepping motor is used as the motor 50. In the stepper motor, a full rotation is divided into a plural number of steps. If the stepper motor is controlled in a manner where one step has very small rotation angle, it is possible to perform the rotating movement of the rotary device 400 with a high resolution. Therefore, an accurate determination of the direction of the object can be achieved. Furthermore, it is allowable to use other type of motor than the stepper motor as the motor 50. For example, a servomotor can be useful. If a motor whose shaft rotates with a constant speed is used as the motor 50, a necessary time until the rotary device 400 is directed to a measurement range is easily calculated. Thus, the laser diode controlling block is operated in such a manner that the timing of outputting the electric current pulse as the command signal to the laser diode 10 is synchronized with the arrival timing when the rotating angle of the shaft of the motor is achieved at a desired value. As the result of this, the laser diode 10 emits the outgoing laser beam L0 with appropriate timing to detect an object in the desired direction. In the present embodiment, in order to detect the rotation angle of the motor 50, a rotation angle sensor 52 is provided and is connected to the motor 50. A rotary encoder that converts the angle of the shaft 51 of the motor 50 into an analog or digital electric signal is adopted to be used as an example of the rotation angle sensor 52. As discussed above, any type of electric motor may be acceptable to be used as the motor 50.

Further, the laser radar apparatus 100 according to the present embodiment includes an optical element 1000 that serves as beam transforming means. The optical element 1000 is positioned on the axis of the outgoing laser beam L0 between the laser diode 10 and the measurement range outside the apparatus 100. In particular, it is preferable that the optical element 1000 is located on the axis of the outgoing laser beam L0 emitted from the laser diode 10 between the laser diode 10 and the through-hole 32 of the mirror 30.

The optical element 1000 includes a transmission type diffraction grating. The outgoing laser beam L0 is transmitted through the optical element 1000 and is transformed so as to have a predetermined projection pattern that covers a larger cross sectional area than the cross sectional area of the collimated outgoing laser beam L0 by the optical lens 60. The incident laser beam to the optical element 1000 is the laser beam of parallel rays collimated by the optical lens 60. After the incident laser beam is transmitted by the optical element 1000, the diameter of the outgoing laser beam L0 is increased. Hence the irradiated area on a target surface F of the object located in the measurement range is also enlarged comparing with the case where the optical element 1000 is not included.

Figure 6:
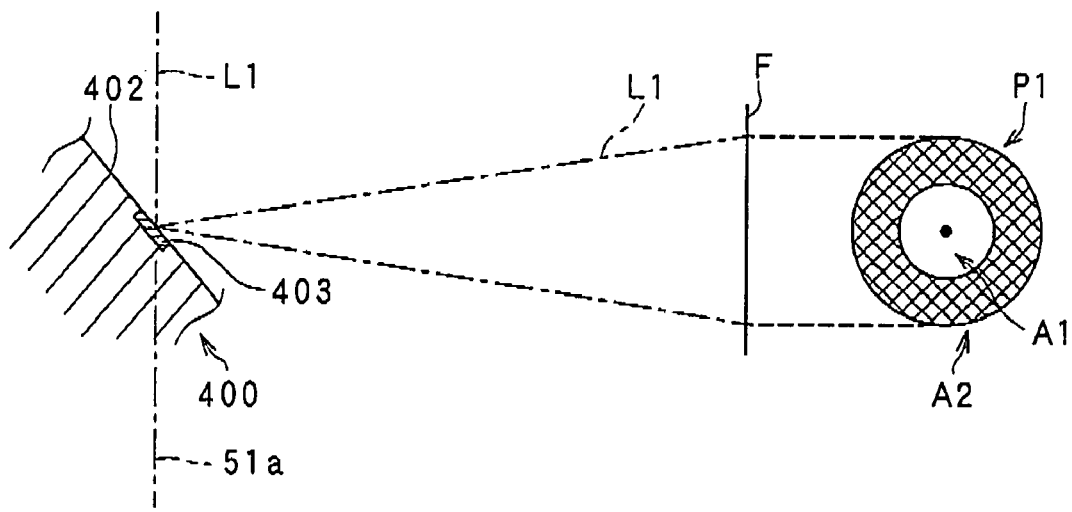
FIG. 6 is a graph illustrating a projection pattern of an outgoing light transmitted through beam transforming means and deflected by a flat reflecting portion according to the first embodiment.

FIG. 6 is a graph showing an exemplary projection pattern of the first outgoing light L1 generated by the optical elements 1000. In FIG. 6, a ring-shaped projection pattern P1 generated by the optical element 1000 is shown.

the image of the flat reflecting portion 403 of the concave mirror 401 projected onto a plane perpendicular to the rotation axis 51a has the shape of circle. That is, when the apparatus 100C having the rotary device 400 is set on the horizontal plane, the first outgoing laser beam L1 exits from the apparatus 100 in the horizontal direction. Thus, if a vertical plane F is prepared in the measuring range, and the first outgoing laser beam L1 is incident on the vertical plane F, the distribution of intensity of the first outgoing laser beam L1 has a circular shape, as shown in FIG. 6.

The ring-shaped projection pattern P1 includes a dark area A1 and a bright area A2, wherein a greater intensity of light shines upon the bright area A2 than the dark area A1. The dark area A1 is enclosed by the bright area A2. Other pattern than the ring-shaped projection pattern P1 can be generated by utilizing some known spectroscopic technique.

Further, in the present embodiment, a collective lens 1100 is provided between the mirror assembly 300 and the photo diode 20. The collective lens 1100 collects the incoming laser beam L3 that arrives in the collective lens 1100 from the measurement range via the concave mirror 401 and the mirror assembly 300 to the photo diode 20. Hence, a focal point of the collective lens 1100 is located on a detecting surface of the photo diode 20 on which the incoming laser beam L3 is received. The collective lens 1100 corresponds to laser beam collecting means.

Further, in the present embodiment, a cover case 3 is provided to house the laser diode 10, the photo diode 20, the mirror assembly 300, the optical lens 60, the rotary device 400 and the collective lens 1100. Thus, those elements can be protected from dust or physical shock. The cover case 3 has an optical window 4 through which the first outgoing laser beam L1 and the incoming laser beam L3 is emitted from and enters into the apparatus 100, respectively. Hence, the optical window 4 has the same level with the concave mirror 401. The optical window 4 surrounds the concave mirror 401 and has the shape of a ring having a center located at a point where the axis of the first outgoing laser beam L1 intersects a cross section of the ring-shaped optical window 4. The optical window 4 is covered by a transparent plate 5 such as a transparent glass in order to prevent the concave mirror 401 and other elements of the apparatus 100 from being exposed to dust. The transparent plate 5 is arranged to be at an angle that is slightly deviated from right angles with the axes of the first outgoing laser beam L1 and the incoming laser beam L3. Thus, even if the first outgoing laser beam L1 is reflected by the transparent plate 5, the reflected outgoing laser beam does not have its axis identical with the first outgoing laser beam L1 and the incoming laser beam L3. Therefore, a reflection of the first outgoing laser beam L1 by the transparent plate 5 may not interfere with determining the distance of the object from the apparatus 100.

Further, in the present embodiment, the control device 82 and memory 84 are included in the apparatus 100.

Further, the second outgoing laser beam L2 split by the half-silvered mirror 80 is directed to the photo diode 20 and is detected by the photo diode 20 to measure the intensity thereof. The intensity of the second outgoing laser beam L2 detected by the photo diode 20 is correlated to that of the outgoing laser beam L0 emitted from the laser diode 10. Hence if a feedback control operation is applied to control the laser diode 10, the intensity of the outgoing laser beam L0 is adjusted to a proper value. In this embodiment, the control device 82 and the memory 84 carry out the feedback control operation for controlling the laser diode 10.

The control device 82 can be constructed by a microcomputer that has a central processing unit (CPU) and the memory 84 can be constructed by a memory such as a read only memory (ROM), a random access memory (RAM), a non-volatile memory and the like. The control device 82 and the memory 84 correspond to an example of output intensity adjusting means that adjusts the output intensity of the outgoing laser beam L0 from of the laser diode 10.

The CPU of the control device 82 carries out the feedback control operation defined by a computer program stored in the memory 84. The feedback control operation comprises steps of estimating the output intensity of the outgoing laser beam L0 from the laser diode 10, comparing the output intensity of the outgoing laser beam L0 with a reference value, and correcting the output intensity of the outgoing laser beam L0. The feedback control operation is started t at a predetermined interval or only when a predetermined condition, for example, a condition in which an operator of the apparatus 100 turns on a switch that controls the operation, is satisfied.

Next, referring to FIGS. 2 and 3, the mirror assembly 300 having the mirror 30 and the half-silvered mirror 80 in the present embodiment will be discussed in detail.

Figure 2:
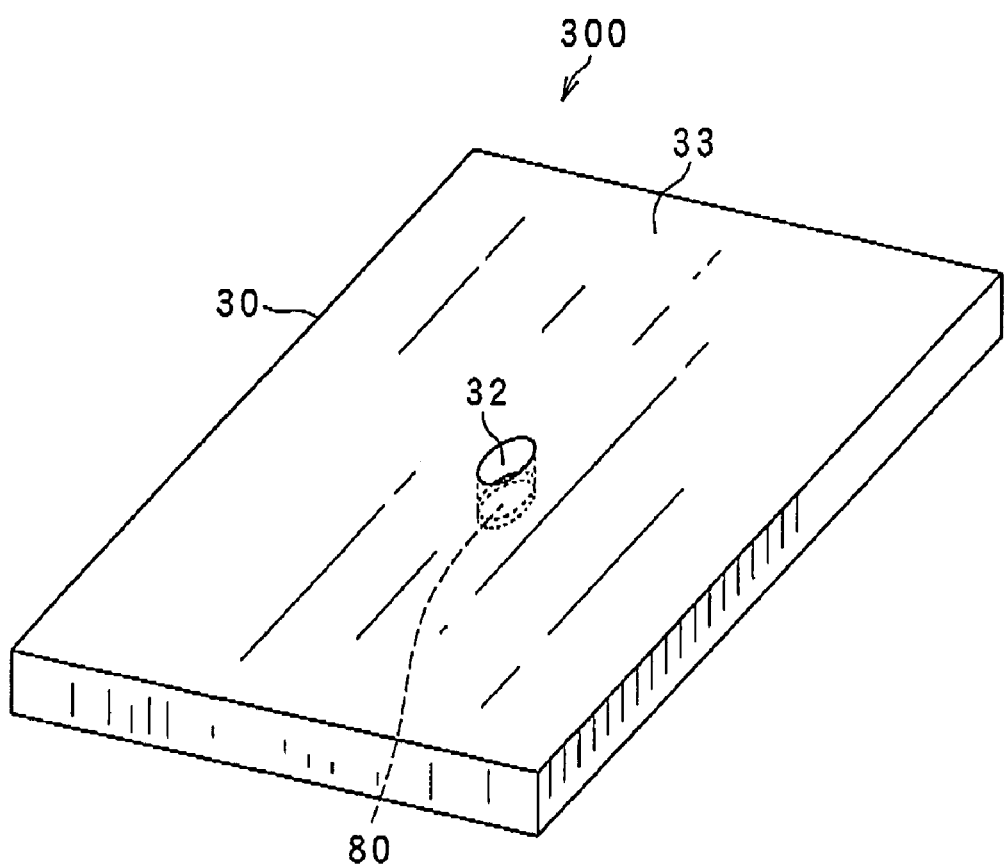
FIG. 2 is a schematic view of a mirror having a through-hole and a half-silvered mirror according to the first embodiment shown in FIG. 1.

FIG. 2 is a schematic view of a mirror having a through-hole and a half-silvered mirror according to the first embodiment shown in FIG. 1.

As shown in FIG. 2, the mirror 30 of the mirror assembly 300 is shaped like a plate having one surface 33 and another non-illustrated surface 31 opposite to the surface 33. The surface 31 of the mirror 30 corresponds to the reflection plane. The through-hole 32 is formed near the center of the surface 31 so as to pierce the mirror 400 from the surface 33 to the opposite surface 31.

Further, the mirror assembly 300 includes the half-silvered mirror 80 that serves as the beam splitting means. The half-silvered mirror 80 is arranged to be coaxial with the axis of the outgoing laser beam L0, that is with the axis of the through-hole 32. The mirror assembly 300 splits the outgoing laser beam L0 into the first outgoing laser beam L1 and the second outgoing laser beam L2. The directions of the first outgoing laser beam L1 and the second outgoing laser beam L2 are different from each other. The first outgoing laser beam L1 has the same optical path with the outgoing laser beam L0 of the first embodiment. That is, the first outgoing laser beam L1 enters to the concave mirror 401. Hence, the feedback control operation can be performed to adjust the output intensity of the outgoing laser beam L0 based on the detected intensity of the second laser beam L2 by the photo diode 20, as shown in FIG. 3.

Figure 3:
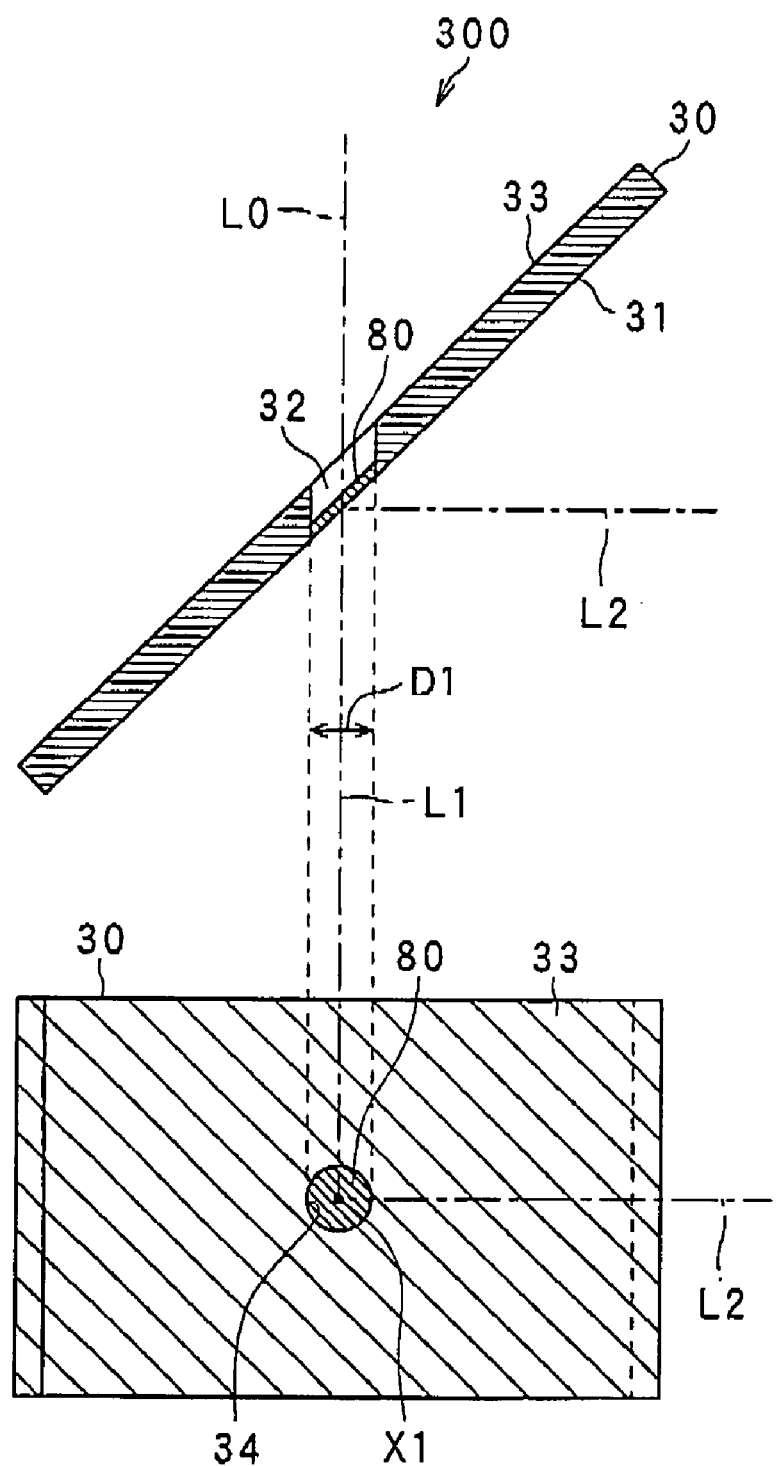
FIG. 3 is a cross sectional view and a bottom view of the mirror shown in FIG. 2.

FIG. 3 is a cross sectional view and a bottom view of the mirror assembly 300 shown in FIG. 2.

In the present embodiment, the through-hole 32 is formed such that the outgoing laser beam L0 passes through the through-hole 32, that is, the center axis of the through-hole 32 is arranged to be identical with the axis of the outgoing laser beam L0. As can be seen in FIG. 3, the through-hole 32 is covered by the half-silvered mirror 80.

Figure 5:
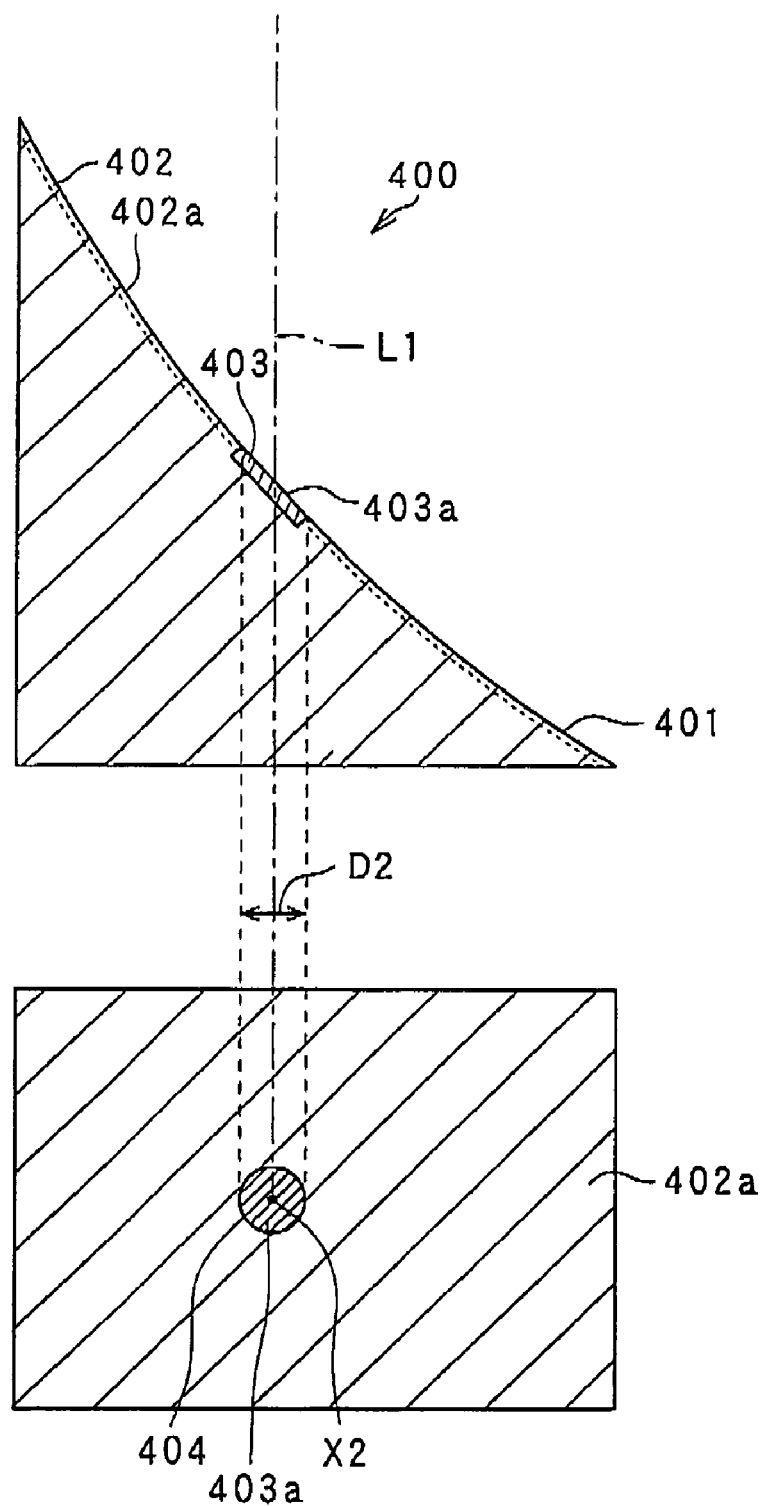
FIG. 5 is a cross sectional view and a bottom view of the rotating device shown in FIG. 4.

As shown in FIG. 3, the through-hole 32 is formed in the shape of the tube having an axis. The axis of the through-hole 32 is coincident with that of the outgoing laser beam L0. This means that the axis of the through-hole 32 is coincident with that of the first outgoing laser beam L1. The through-hole 32 has a circular shaped cross section 34 along its axis. That is, if the through-hole 32 is projected on a plane perpendicular to the axis of the first outgoing laser beam L1 as shown in FIG. 5, the projected image of the through-hole 32 is a circle 34 having its center at a point X1 that is the center of the cross section of the first outgoing laser beam L1. The through-hole 32 has a constant diameter D1. It is allowed that the through-hole 32 has other shaped cross section such as an ellipse shaped one or the like.

The half-silvered mirror 80 covers the through-hole 32. In this embodiment, as shown in FIG. 3, the projected image of the half-silvered mirror 80 that is obtained by projecting the silvered mirror 80 onto the plane perpendicular to the axis of the first outgoing laser beam L1 has a circular shape. That is, the silvered mirror 80 has a substantially elliptic shape because an ellipse arranged to be tilted in this manner has a circular projected image when the ellipse is projected onto the horizontal plane.

Next, referring to FIGS. 4 and 5, the rotating device 400 having the concave mirror 401 further having a concave reflecting portion 402 that has a concave-shaped mirror surface 402a and a flat reflecting portion 403 that has a flat mirror surface 403a in the present embodiment will be discussed in detail.

Figure 4:
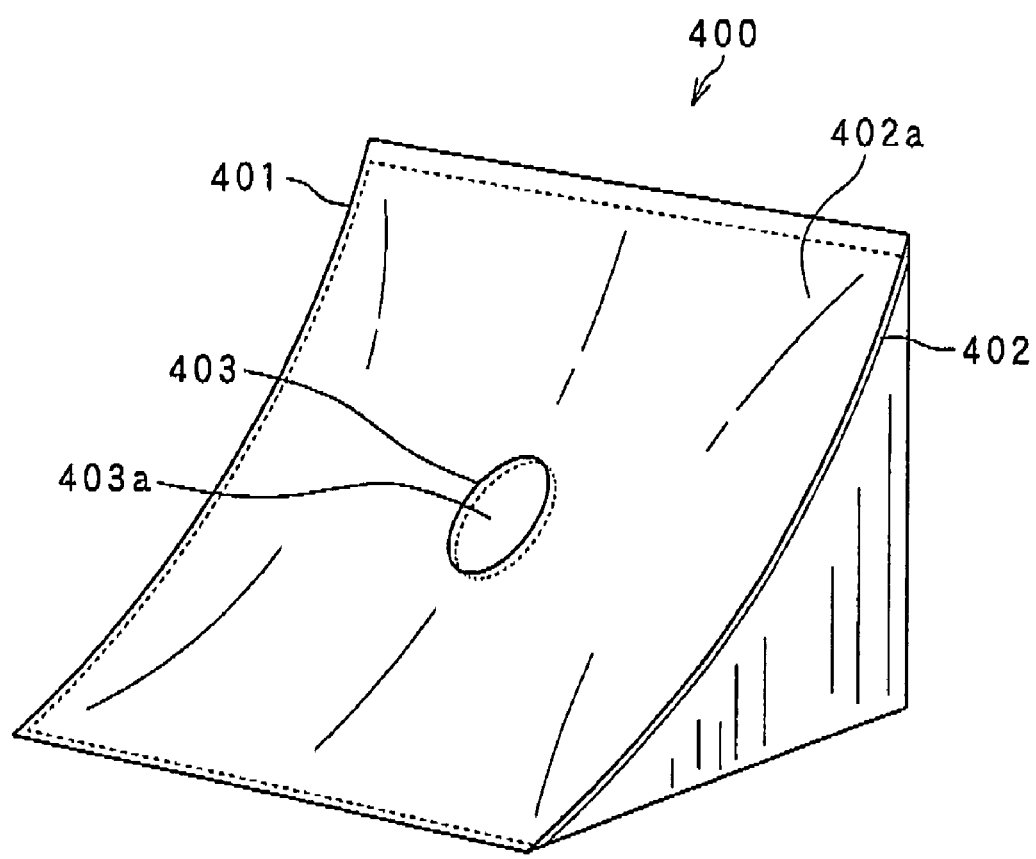
FIG. 4 is a schematic view of a rotating device having a concave mirror portion and a flat mirror portion according to the first embodiment shown in FIG. 1.

FIG. 4 is a schematic view of the rotating device 400 having the concave reflecting portion 402 that has the concave-shaped mirror surface 402a and a flat reflecting portion 403 that has a flat mirror surface 403a.

As shown in FIG. 4, the concave mirror 401 has a concave reflecting portion 402 that has a concave-shaped mirror surface 402a and a flat reflecting portion 403 that has a flat mirror surface 403a. The surface of the concave mirror 401 is covered by the flat mirror surface 403a of the flat reflecting portion 403 and the concave-shaped mirror surface 402a such that the flat mirror surface 403a is enclosed within the concave-shaped mirror surface 402a.

FIG. 5 is a cross sectional view and a bottom view of the rotating device shown in FIG. 4.

As shown in FIG. 5, the flat mirror surface 403a is configured such that the first outgoing laser beam L1 split by the half-silvered mirror 80 enters to and is reflected by the flat mirror surface 403a. That is, the flat mirror surface 403a of the concave mirror 401 is arranged to be coaxial with the axis X2 of the first outgoing laser beam L1. If the surface of the concave mirror 401 is projected to a plane perpendicular to the axis of the first outgoing laser beam L1 as shown in FIG. 5, the projected image of the surface of the concave mirror 401 is a circle 404 having the center at a point X1 and a diameter D2. It is allowed that the projected image of the surface of the concave mirror 401 has another shaped cross section such as an ellipse shaped one or the like.

Next, the feedback control operation of the laser diode 10 will be explained.

Figure 7:
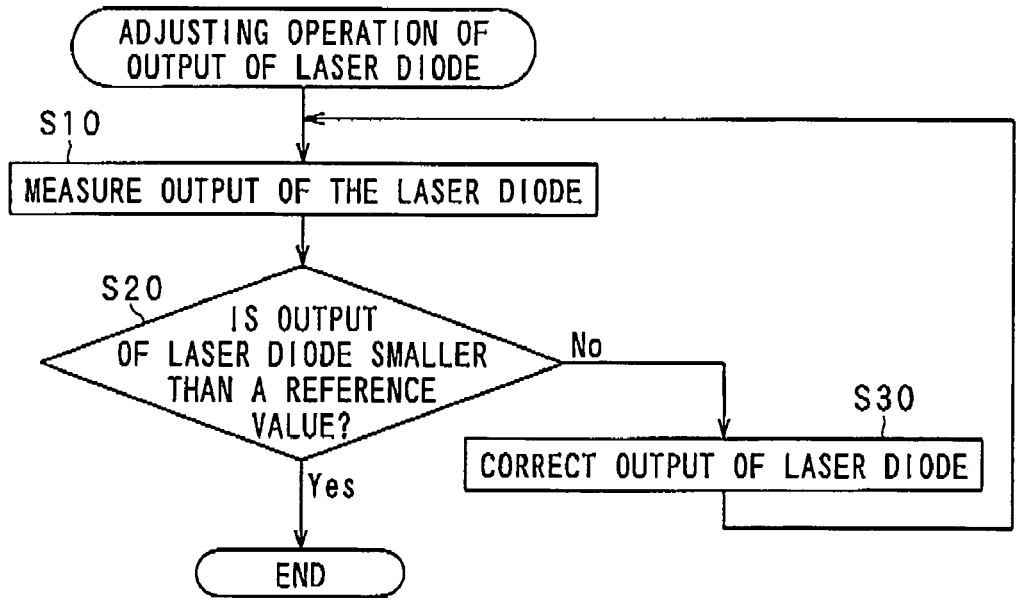
FIG. 7 is a flow chart for explaining a feedback control operation of a laser diode performed by laser-output control means that adjusts an output intensity of a laser beam from the laser diode of the laser radar shown in FIG. 1.

FIG. 7 is a flow chart for explaining the feedback control operation of the laser diode 10 performed by the control device 82 and the memory 84 that adjusts the output intensity of the outgoing laser beam L0 from of the laser diode 10.

In step S10, the output intensity of the outgoing laser beam L0 from the laser diode 10 is estimated. The second outgoing laser beam L2 is split by the half-silvered mirror 80. Hence, because the intensity of the second outgoing laser beam L2 detected by the photo diode 20 is correlated to the output intensity of the outgoing laser beam L0 emitted from the laser diode 10, the output intensity of the outgoing laser beam L0 from the laser diode 10 can be obtained based on the intensity of the second outgoing laser beam L2 detected by the photo diode 20.

Next, in step S20, the estimated value of the output intensity of the outgoing laser beam L0 from the laser diode 10 is compared with the reference value. More explicitly, it is determined whether or not the intensity of the second outgoing laser beam L2 detected by the photo diode 20 is larger than a threshold value. The threshold value of the intensity of the second outgoing laser beam L2 depends on the reference value of the output intensity of the outgoing laser beam L0. In general, it is expected that the output intensity of the outgoing laser beam L0 from the laser diode 10 is proportional to the intensity of the second outgoing laser beam L2 detected by the photo diode 20. In other words, it is expected that if the intensity of the second outgoing laser beam L2 is larger than the threshold value, the output intensity of the outgoing laser beam L0 is larger than the reference value. Thus, if the output intensity of the outgoing laser beam L0 is larger than the reference value, the determination in the step 520 is concluded to be "NO", and the procedure proceeds to step S30.

In step S30, the output intensity of the outgoing laser beam L0 is corrected by reducing the amplitude of the command signal that is controlled by the control device 82. The command signal is supplied from a laser diode driving block which is not shown in FIG. 4 and is connected to both the laser diode 10 and the control device 82. As a result of this step, the output intensity of the outgoing laser beam L0 is reduced and becomes within an allowable range. Then, the procedure proceeds to the step 510.

In contrast to this case, if the output intensity of the outgoing laser beam L0 is smaller than or equal to the reference value, the determination in the step S20 is "YES" and the feedback control operation of the laser diode 10 is completed.

In the present embodiment, the beam splitting means 80 of the mirror assembly 300 splits the outgoing laser beam L0 into the first outgoing laser beam L1 and the second outgoing laser beam L2. The beam splitting means 80 includes the half-silvered mirror. The first outgoing laser beam L1 enters to the concave mirror 401 although the second outgoing laser beam L2 is directed to the photo diode 20.

Further, the feedback control operation is performed to adjust the output intensity of the outgoing laser beam L0 based on the detected intensity of the second laser beam L2 by the photo diode 20.

(Operations of the Laser Radar Apparatus)

The operation of the laser radar apparatus 100 will be explained.

First, the laser diode controlling block sends the command signal to the laser diode 10. The command signal contains, for example, the electric current pulses that lead the laser radar 10 to output the laser beam pulses L0 proportional to the electric current pulses. That is, the laser beam pulses having a length proportional to the electric current pulse L0 are emitted from the laser diode 10. The laser beam pulses L0 emitted from the laser diode 10 will diffuse during travel because the laser beam pulses L0 have an initial diffusion angle just after they are emitted from the laser diode 10.

Next, the laser beam pulses L0 are converted to parallel laser pulses L0 by the optical lens 60.

The laser pulses of parallel rays L0 collimated by the optical lens 60 pass through the through-hole 32 of the mirror 30.

Then, the laser pulses of parallel rays L0 passed through the through-hole 32 of the mirror 30 become incident laser pulses L0 to the optical element 1000 that serves as the beam transforming means. The optical element 1000 includes a transmission type diffraction grating. The outgoing laser beam L0 is transmitted through the optical element 1000 and is transformed so as to have a predetermined projection pattern that covers a larger cross sectional area than the cross sectional area of the collimated outgoing laser beam L0 by the optical lens 60.

Then, the first outgoing laser beam L1 transmitted through the optical element 1000 and split by the half-silvered mirror 80 enters to the concave mirror 401.

The flat mirror portion 403 of the concave mirror 401 deflects the first outgoing laser beam L1. Hence the first outgoing laser beam L1 deflected from the concave mirror 401 exits to the measurement range to detect an object.

If some object is located in the measurement range, the object reflects the first outgoing laser beam L1 emitted from the apparatus 100. Some part of the laser pulses having around zero degrees angle of reflection at the surface of the object return to the apparatus 100 as the incoming laser beam L3.

After passing the optical window, the incoming laser beam L3 or incoming laser pulses L3 are incident to and reflected by the concave mirror 401. In this case, the concave-shaped mirror portion 402 of the concave mirror 401 serves as a collective lens that collects the incoming laser beam L3 to reduce the area of its cross section such that all of the incoming laser beam L3 can be captured by the mirror 30. The reflected laser beam L3 from the concave mirror 401 is reflected by the mirror 30. Then, the incoming laser beam L3 enters to the collective lens 1100.

The collective lens 1100 collects the incoming laser beam L3 that arrives in the collective lens 1100 to the photo diode 20.

Then, the reflected laser beam L3 is detected by the photo diode 20 and is converted to an electric signal whose amplitude is a function of the intensity of the reflected laser beam L3.

In the present configuration, the time of flight between a moment when the outgoing laser beam L0 is emitted from the laser diode 10 and a further moment when the incoming laser beam L3 is captured by the photo diode 20 is measured to obtain the distance to the object that is located in the measurement range and reflected the first outgoing laser beam L1 from the apparatus 100 using the speed of light. The direction of the object is directly obtained based on the rotation angle of the motor 50 that drives the concave mirror 401.

(Advantages of the Laser Radar Apparatus)

Figure 14:
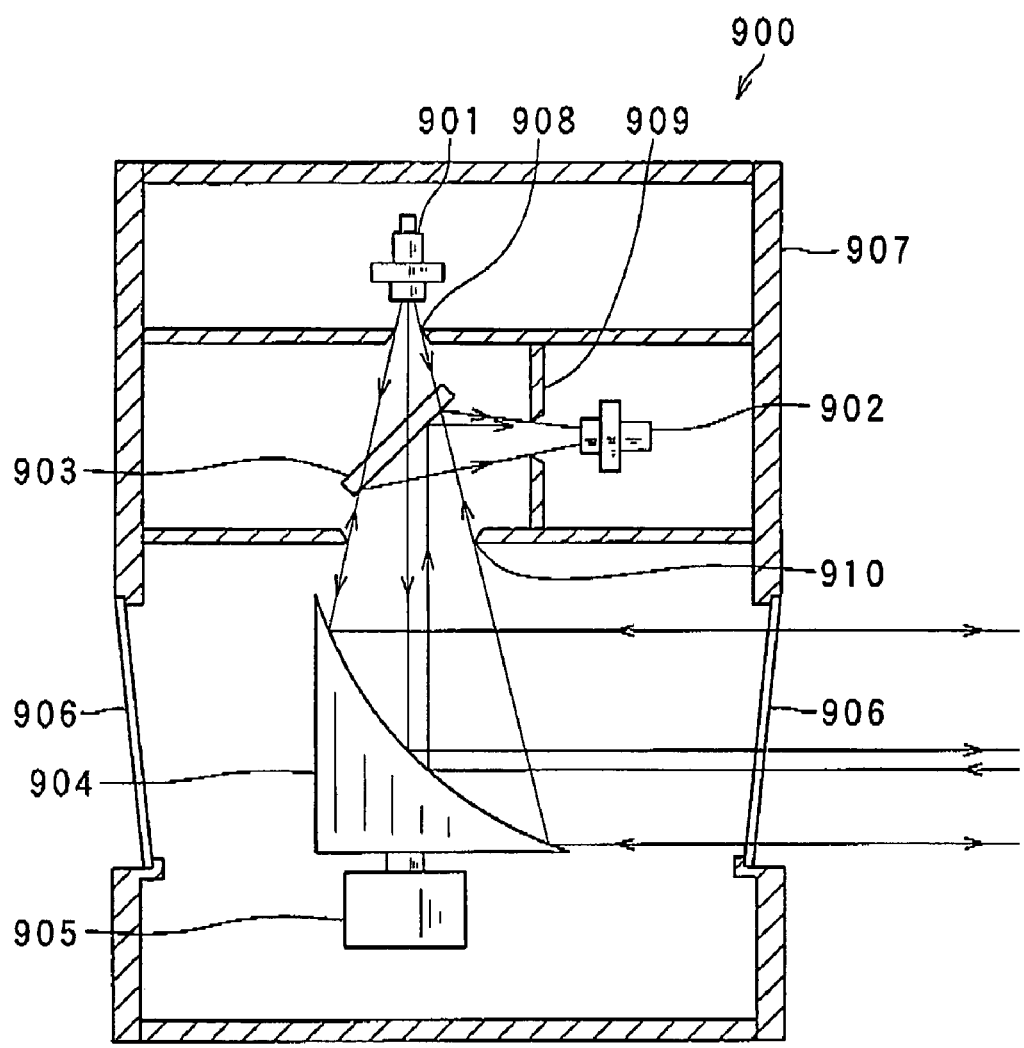
FIG. 14 is a schematic view of a conventional laser radar apparatus.

FIG. 14 is a schematic view of a conventional laser radar apparatus 900.

The known laser radar apparatus 900 includes a laser diode 901, a photo diode 902, an optical isolator 903, a concave mirror 904, a motor 905, a optical window 906, a cover case 907, a first slit 908, a second slit 909, and a third slit 910. The apparatus 900 is configured to detect the distance of an object based on a time of flight between the moment when the laser diode 901 emits a laser beam toward the measurement range and a further moment when the photo diode 902 detects the reflected laser beam from the object using the speed of light. The direction of the object is determined by the rotation angle of the motor 905.

The laser diode 901 emits the laser beam having a predetermined diffusion angle. The optical isolator 902 transmits the laser beam emitted from the laser diode 901. The concave mirror 904 deflects the laser beam injected from the laser diode 901 via the optical isolator 903 toward the measurement range. If the object exists within the measurement range, the reflected laser beam comes back from the object. The reflected laser beam is deflected by the concave mirror 904. Because the concave mirror 904 is arranged with the laser diode 901, the reflected laser beam from the object is deflected by the optical isolator 903 toward the photo diode 902.

The laser diode 901, the photo diode 902, the optical isolator 903, the concave mirror 904, and the motor 905 are housed inside the cover case 907 having the optical window 906. The laser beam exits to the measurement range and is reflected back by the object located in the measurement range via the optical window 906.

In the apparatus 900, attenuation of the laser beam is caused during both the transmission and the deflection of the laser beam through and by the optical isolator, respectively.

In contrast to the case of the apparatus 900, the laser radar apparatus 100 does not use the optical isolator.

As explained so far, in the laser radar apparatus 100, there is the mirror 30 which is arranged at a predetermined angle, for example, at an angle of about 45 degrees with respect to the axis of the outgoing laser beam L0. Further, the mirror 30 has the through-hole 32 through which the outgoing laser beam L0 passes without any loss of the intensity thereof. Further, the mirror 30 has the reflection plate 31 that reflects the incoming laser beam L3 toward the photo diode 20. Therefore, the mirror 30 of the laser radar apparatus 100 according to the present invention improves the optical loss characteristics thereof during the transmission of the outgoing laser beam L0 and the reflection of the incoming laser beam L3. As a result of this improvement of the optical loss characteristics of the mirror 30, the accuracy of detecting the distance of an object from the apparatus 100 is also improved effectively. In particular, in the present embodiment in which the through-hole 32 of the mirror 30 is empty, the attenuation of the outgoing laser beam L0 which caused by the mirror 30 is effectively improved relative to the apparatus 900. Further, the outgoing laser beam L0 passed through the through-hole 32 is deflected by the flat mirror portion 403 of the concave mirror 401, before the outgoing laser beam L0 exits from the apparatus to the measurement range. Hence, it is prevented from causing beam diffusion in deflecting the outgoing laser beam L0 at the surface of the concave mirror 401. Therefore, the optical laser beam apparatus 100 can detect the distance of an object located far from the apparatus 100 accurately. Further, the incoming laser beam L3 from the measurement range is deflected by the concave-shaped mirror surface 402a of the concave reflecting portion 402 toward the mirror assembly 300. Thus, the incoming laser beam can arrive at the photo diode 20 with the minimum loss of its intensity. Therefore, it is possible to reduce the loss of intensity of the incoming laser beam L3 during traveling inside the cover case 3 of the apparatus 100.

If a projection optical system is defined as an assembly including the laser diode 10, the motor 50, the optical lens 60, the optical element 1000, the mirror 30, and the concave mirror 401 and a photo detecting system is defined as an assembly including the concave mirror 401, the mirror 30 including the half-silvered mirror 80, the motor 50, the collective lens 1100 and the photo diode 20, the laser radar apparatus 100 according to the present embodiment has improved beam splitting efficiency and improved accuracy of detecting the direction and the distance to an object without sacrificing the small size of the laser radar apparatus due to the coaxial structure of the projection optical system and the photo detecting system.

Further, in the present embodiment, there is the optical lens 60 that is located between the laser diode 10 and the through-hole 32 of the mirror 30 and is arranged to be coaxial with the axis of the outgoing laser beam L0. Thus, during passing through the through-hole 32 of the mirror 30, the outgoing laser beam L0 is constituted of the laser pulses of parallel rays not having a diffusion angle, because the diffusive laser beam pulses emitted from the laser diode 10 are converted to parallel laser pulses L0 by the optical lens 60. This reduces the diameter D1 of the through-hole 32 and the optical loss characteristics of the mirror 30 in reflecting the incoming laser beam L3 can be improved. Therefore the loss of intensity of the incoming laser beam L3 caused during reflection by the mirror 30 can be minimized.

Further, the apparatus 100 includes the optical element 1000 positioned on the axis of the outgoing laser beam L0 between the laser radar 10 and the through-hole 32 of the mirror assembly 300. In this configuration, only the outgoing laser beam L0 enters to the optical element 1000. That is, the incoming laser beam L3 is not transmitted through the optical element 1000. Thus, the optical element 1000 does not cause any loss of the incoming laser beam L3. Therefore, the laser radar apparatus 100 has improved beam splitting efficiency and improved accuracy of detecting the direction and the distance to an object.

Further, the optical element 1000 includes the transmission type diffraction grating to generate the predetermined projection pattern of the outgoing laser beam L0. In the optical element 1000, the incident laser beam is dispersed such that the diameter of the outgoing laser beam L0 is increased by its traveling through the optical element 1000. Hence the irradiated area on a target surface F of the object located in the measurement range is also enlarged compared with the case where the optical element 1000 is not included. The beam transforming means includes the optical element 1000. Therefore the functions of the beam transforming means can be easily and reliably realized by the optical element 1000.

The predetermined projection pattern of the first outgoing laser beam L1 includes the dark area A1 and the bright area A2, wherein a greater intensity of light shines upon the bright area A2 than the dark area A1. Thus, the mirror assembly 300 can reduce the loss of the incoming laser beam L3 generated by the incoming laser beam L3 injecting the through-hole 32. Therefore, the laser radar apparatus 100 has improved beam splitting efficiency and improved accuracy of detecting the direction and the distance to an object.

Further, in the present embodiment, the collective lens 1100 is provided between the mirror 30 and the photo diode 20. The collective lens collects the incoming laser beam L3 to the detection surface of the photo diode 20. Hence, at least one of the distance between the mirror 30 and the photo diode and the further distance between the mirror 30 and the rotating device 400 can be reduced. Further, it is possible to use the smaller photo diode 20 because the incoming laser beam L3 that arrives at the photo diode 20 is collected by the collective lens 1100 and the density thereof is sufficiently high. Therefore the laser radar apparatus 100 can be reduced in size.

Further, the incoming laser beam L3 is reflected from the reflection plane 31 of the mirror 30 in the present embodiment. Therefore, nearly perfect reflection of the incoming laser beam L3 from the reflection plane 31 of the mirror 30 can be realized, in spite of the fact that some loss of the intensity of the incoming laser beam L3 is caused due to the through-hole 32 and it is impossible to realize nearly perfect reflection in the optical isolator. Therefore, the attenuation of the incoming laser beam L3 which caused during traveling in the apparatus 100 is significantly improved.

Further, in the present embodiment, the through-hole 32 of the mirror 30 is designed such that the projected image of the through-hole 32 has a circular shape having the center at a point X1, if the through-hole 32 is projected to a plane perpendicular to the axis of the outgoing laser beam L0, as shown in FIG. 3. Hence, the central part of the outgoing laser beam L0 which has the maximum intensity of light will pass through the through-hole 32 without any loss of the intensity. Therefore, it is possible to improve the optical loss characteristics of the apparatus 100.

Further, the concave mirror 401 reflects the outgoing laser beam L0 emitted from the laser diode 10 toward the measurement range outside the apparatus 100 and deflects the incoming laser beam L3 from the object located in the measurement range, if it exists, toward the mirror 30. Thus, the laser radar apparatus 100 according to the present embodiment has improved beam splitting efficiency and improved accuracy of detecting the direction and the distance to an object without sacrificing the small size of the laser radar apparatus. Further, the concave mirror 401 has the flat reflecting portion 403 that has the flat mirror surface 403a that is configured such that the outgoing laser beam L0 emitted by the laser diode 10 enters to and is reflected by the flat mirror surface 403a. Thus, it is possible to prevent from causing beam diffusion during the outgoing laser beam L0 being reflected by the concave mirror 401. Therefore, the laser radar apparatus 100 has improved beam splitting efficiency and improved accuracy of detecting the direction and the distance to an object.

Further, due to the combination of the optical element 1000 and the flat mirror portion 403 of the concave mirror 401, efficient emission of the first outgoing laser beam L1 from the apparatus 100 to the measurement range can be obtained because heavy part of the outgoing laser beam generated by the optical element 1000 is reflected by the flat mirror portion 403 without causing the beam diffusion of the first outgoing laser beam L1 due to the reflection by the flat mirror portion 403.

Further, in the present embodiment, the feedback control operation is performed to adjust the output intensity of the outgoing laser beam L0 based on the detected intensity of the second laser beam L2 by the photo diode 20.

Therefore it is possible to properly adjust the output intensity of the outgoing laser beam L0 based on the actual output intensity of the outgoing laser beam L0. Further, if the beam splitting means 80 is constituted of the half-silvered mirror, high efficiency is obtained. Therefore, the laser radar apparatus 100 according to the present embodiment obtains improved beam splitting efficiency and improved accuracy of detecting the direction and the distance to an object without sacrificing the small size of the laser radar apparatus due to the coaxial structure of the projection optical system and the photo detecting system.

(Modification of the First Embodiment)

Figure 8:
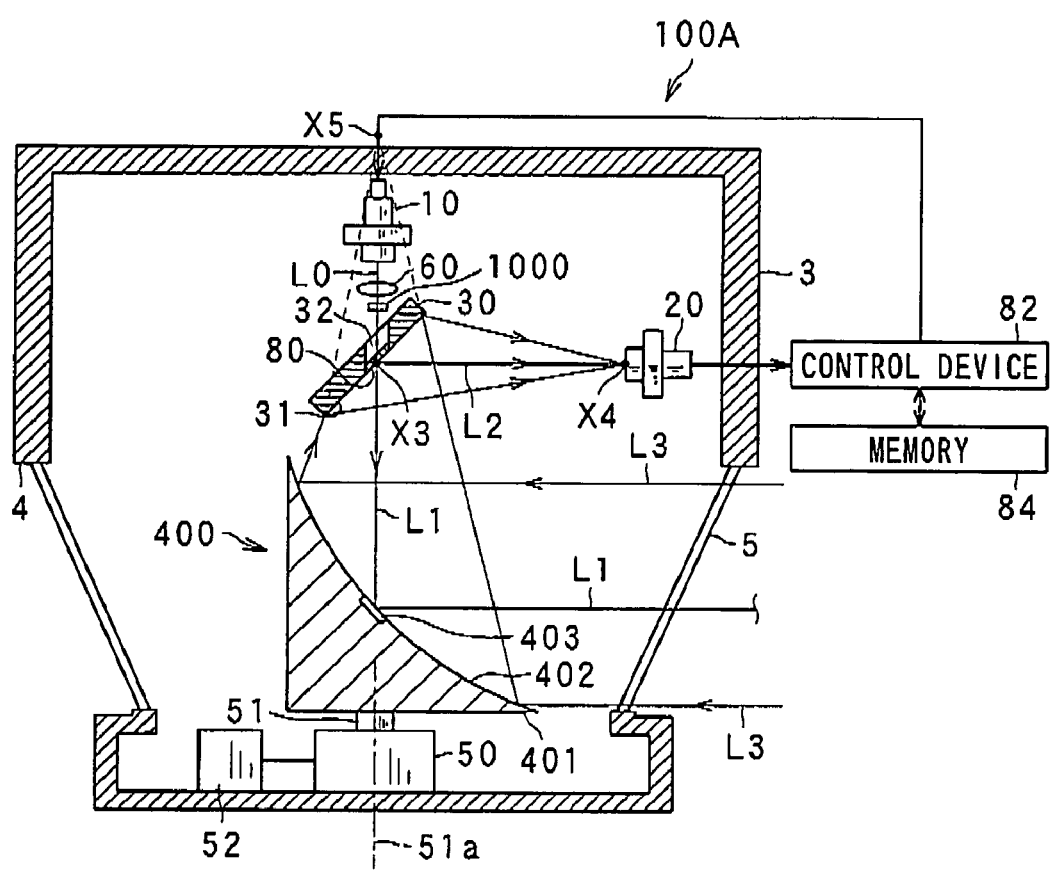
FIG. 8 is a schematic view of a laser radar apparatus according to a modification of the first embodiment of the present invention.

Referring to FIG. 8, a laser radar apparatus according to a modification of the first embodiment will be explained.

FIG. 8 is a schematic view of the laser radar apparatus 100A according to the modification of the first embodiment of the present invention.

In the present embodiment, the differences from the previous embodiment are based on the absence of the collimation lens 1100 between the mirror assembly 300 and the photo diode 20.

Here, a first length is defined as a length between a point X3 at which the axis of the outgoing laser beam intersects the surface of the mirror and a further point X5 that corresponds to the focal point of the concave mirror 401. Further, a second length is defined as a length between the point X3 and a point X4 that is located on the axis of the incoming laser beam X3 and on the detection surface of the photo diode 20. The laser radar apparatus 100A is designed such that the first length is equal to the second length. In this configuration, it is possible to omit the collimation lens 1100 between the mirror assembly 300 and the photo diode 20. Therefore, the number of the optical parts included in the laser radar apparatus 100A can be reduced.

Second Embodiment

Figure 9:
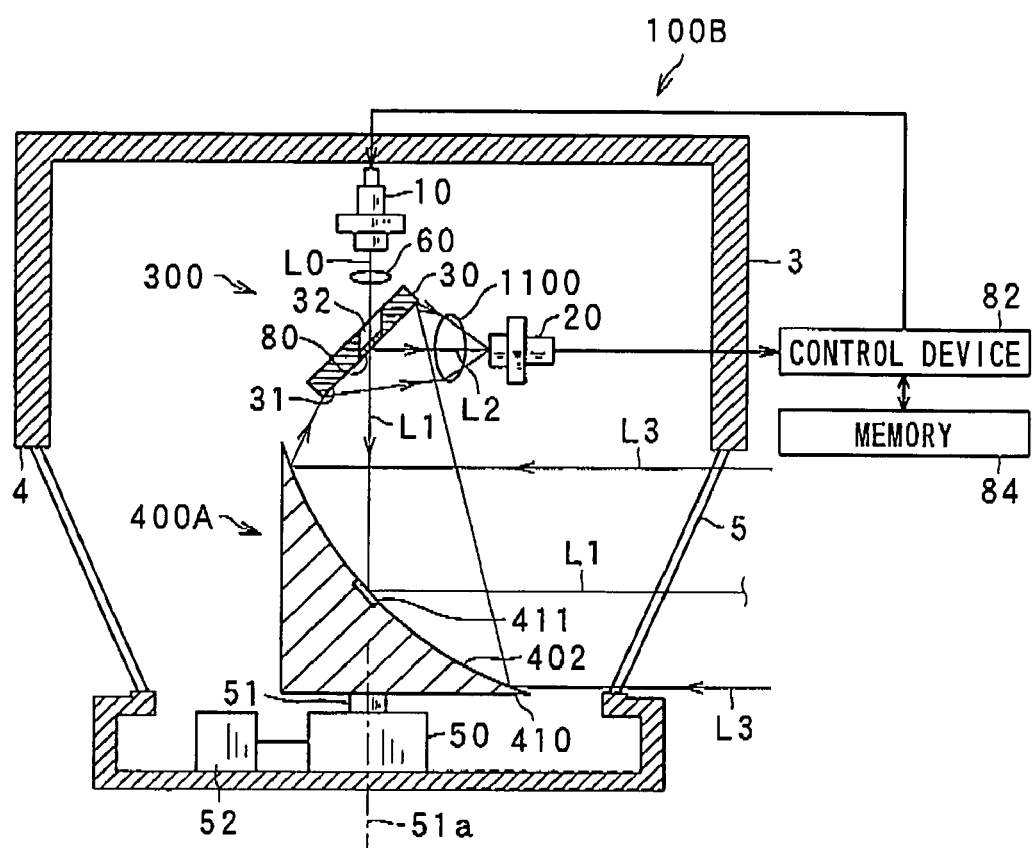
FIG. 9 is a schematic view of a laser radar apparatus according to a second embodiment of the present invention.
Figure 10:
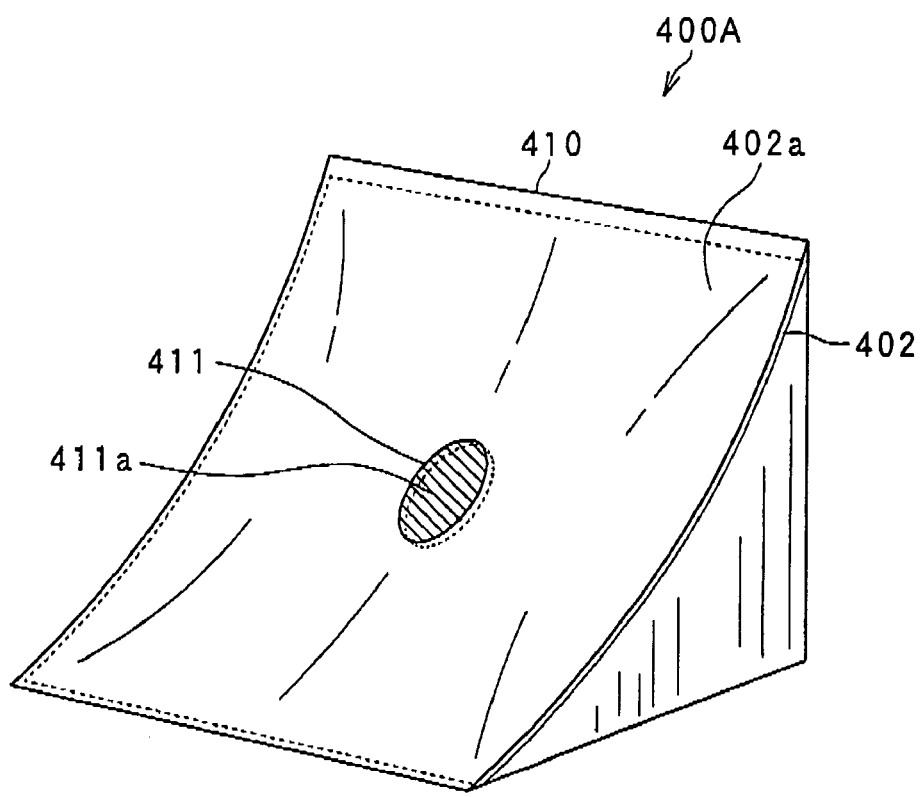
FIG. 10 is a schematic view of a rotating device having a concave mirror portion and a flat mirror portion according to the second embodiment.
Figure 11:
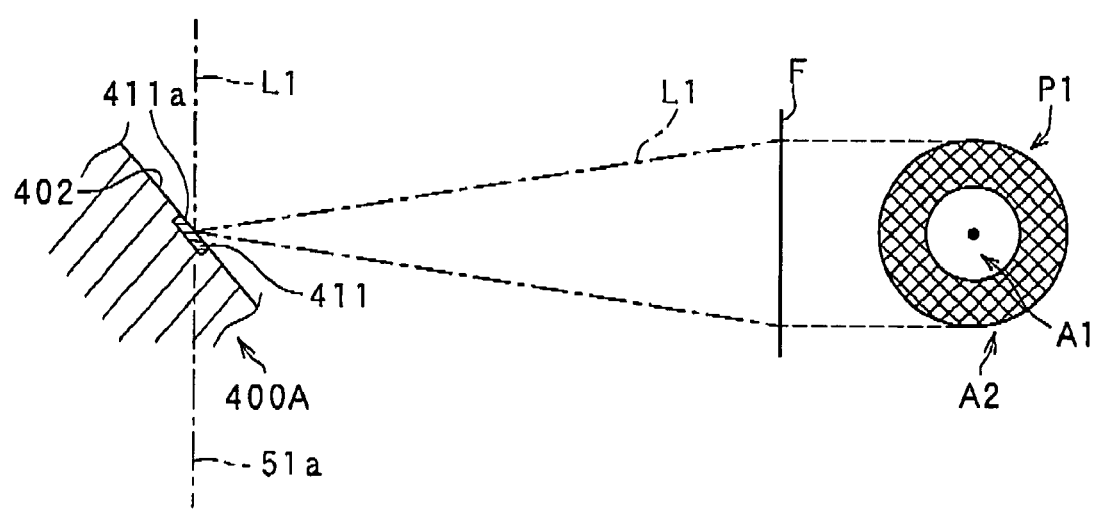
FIG. 11 is a graph illustrating a projection pattern of an outgoing light transmitted through beam transforming means and deflected by a flat reflecting portion according to the second embodiment.

Referring to FIGS. 9-11, a laser radar apparatus according to a second embodiment of the present invention will be described.

FIG. 9 is a schematic view of the laser radar apparatus 100B according to the second embodiment of the present invention.

In the present embodiment, the differences from the previous embodiment are based on the absence of the optical element 1000 between the laser diode 10 and the mirror 30 and the use of a rotating device 400A having a concave mirror 410. Thus, detailed discussion about the constituents of the laser radar apparatuses having the same function and the structure with those used in previous embodiments will be omitted.

As in the case of the first embodiment, the laser radar apparatus 100B is designed to detect the direction and the distance from the apparatus to an object based on the difference of the phases of outgoing light emitted by the laser diode 10 via the half-silvered mirror 80 and a flat mirror surface 411a, and incoming light that is reflected back by the object and received by the photo diode 20 via the concave-shaped mirror surface 402a and the half-silvered mirror 80, or the time of flight between the emission and reception of a light pulse utilizing the speed of light. In this embodiment, the laser diode 10 emits light pulses.

The laser radar apparatus 100B includes a projection optical system and a photo detecting system. The concave mirror 410 further includes a concave reflecting portion 402 that has a concave-shaped mirror surface 402a and a flat reflecting portion 411 that has a flat mirror surface 411a. The flat reflecting portion 411 serves as an optical element.

In the present embodiment, the projection optical system includes the laser diode 10 serving as the elements of the laser beam generating means, the motor 50 serving as the rotation driving means, the optical lens 60 serving as the laser beam collimating means, the mirror assembly 300, and the concave mirror 410 serving as the light deflecting means and the photo detecting system including the concave mirror 410 serving as the light deflecting means, the mirror assembly 300, the photo diode 20 serving as the element of the photo detecting means, and the motor 50 serving as the rotation driving means. The mirror assembly 300 includes the mirror 30 that serves as the laser beam isolating means and the half-silvered mirror 80 that serves as the beam splitting means. The laser diode 10 emits the outgoing laser beam L0.

As in the case of the first embodiment, the mirror assembly 300 has the mirror 30 and the half-silvered mirror 80. The mirror 30 is arranged at a predetermined angle, for example, at an angle of about 45 degrees with respect to the axis of the outgoing laser beam L0. Further, the mirror 30 has the through-hole 32 through which the outgoing laser beam L0 passes without any loss of the intensity thereof. The through-hole 32 is at least partially covered by the half-silvered mirror 80. Further, the mirror 30 has the reflection plate 31 that reflects the incoming laser beam 1-3 toward the photo diode 20. The outgoing laser beam L0 enters the through-hole 32 of the mirror 30, although the incoming laser beam L3 is deflected by the mirror 30. The mirror 30 is substantially formed as a plate having two surfaces. The mirror 30 has the reflection plane 31 which corresponds to one of the surfaces of the mirror 30 and the half-silvered mirror 80. The reflection plane 31 is arranged at predetermined angle to the axis of outgoing laser beam L0. The mirror 30 is substantially formed as a plate having two surfaces. The mirror 30 has a reflection plane 31 which corresponds to one of the surfaces of the mirror 30. The reflection plane 31 is arranged at predetermined angle to the axis of outgoing laser beam L0. The through-hole 32 has a center axis thereof and pierces the mirror 30 such that the center axis of the through-hole 32 crosses a surface of the reflection plate 31. The half-silvered mirror 80 of the mirror assembly 300 splits the outgoing laser beam L0 into a first outgoing laser beam L1 and a second outgoing laser beam L2. The directions of the first outgoing laser beam L1 and the second outgoing laser beam L2 are different from each other. The first outgoing laser beam L1 has the same optical path as the outgoing laser beam L0 of the first embodiment. That is, the first outgoing laser beam L1 enters to the concave mirror 410.

Further, the cover case 3 is provided to house the laser diode 10, the photo diode 20, the mirror assembly 300, the optical lens 60, and the rotary device 400A. The cover case 3 has an optical window 4 through which the outgoing laser beam L0 and the incoming laser beam L3 is emitted from and enters into the apparatus 100B, respectively. The optical window 4 is covered by a transparent plate 5 such as a transparent glass in order to prevent the concave mirror 410 and other elements of the apparatus 100 from being exposed to dust, as in the apparatus 100B according to the first embodiment disclosed above.

Further, the second outgoing laser beam L2 split by the half-silvered mirror 80 is directed to the photo diode 20 and is detected by the photo diode 20 to measure the intensity thereof. The intensity of the second outgoing laser beam L2 detected by the photo diode 20 is correlated to that of the outgoing laser beam L0 emitted from the laser diode 10. Using this fact, the feedback control of the laser diode 10 is carried out by the control device 82, and the memory 84.

Further, similar to the case of the first embodiment, the rotary device 400A is arranged to be rotatable around a rotation axis which is identical with the axis of the first outgoing laser beam L1 using the motor 50, so that an angular scanning range in the horizontal direction can be realized to be of up to 360 degrees. The rotary device 400A includes the concave mirror 410 that deflects the first outgoing laser beam L1 toward the measurement range and also the incoming laser beam L3 reflected back by the object toward the mirror 30. The concave mirror 410 has a focal point on the rotation axis of the rotary device 400.

In order to drive the rotary device 400A to execute the continuous rotating movement, the motor 50 is provided. The motor 50 has the output shaft 51 that drives the rotary device 400A and the concave mirror 410. The motor 50 corresponds to rotation driving means. In order to detect the rotation angle of the motor 50, a rotation angle sensor 52 is provided and is connected to the motor 50.

The concave mirror 410 has the concave reflecting portion 402 that has the concave-shaped mirror surface 402a disclosed in the first embodiment and a flat reflecting portion 411 that has a flat mirror surface 411a.

The surface of the concave mirror 410 is covered by the flat mirror surface 411a of the flat reflecting portion 411 and the concave-shaped mirror surface 402a such that the flat mirror surface 44a is enclosed by the concave-shaped mirror surface 402a. Further the flat mirror surface 411a is configured such that the first outgoing laser beam L1 split by the half-silvered mirror 80 enters to and is deflected by the flat mirror surface 411a. That is, the flat mirror surface 411a of the concave mirror 410 is arranged to be coaxial with the axis of the first outgoing laser beam L1.

The rotary device 400A has a rotation axis 51a that is defined as the axis of the output shaft 51 of the motor 50. The rotation axis 51a is aligned with the axis of the outgoing laser beam L0 and the first outgoing laser beam L1 between the laser diode 10 and the concave mirror 410. The concave reflecting portion 443 of the concave mirror 410 has a focal point on the rotation axis 51a of the rotary device 400A. Hence, after the incoming laser beam L3 reflected back by the object is reflected by the concave reflecting portion 402 of the concave mirror 410, the incoming laser beam L3 is collected to the focal point positioned on the rotation axis 51a.

FIG. 10 is a schematic view of the rotating device 400A according to the second embodiment shown in FIG. 9.

In the laser radar apparatus 100B according to the present embodiment, the flat reflecting portion 411 of the concave mirror 410 includes a reflection type diffraction grating. The flat reflecting portion 411 deflects the first outgoing laser beam L1 split by the half-silvered mirror 80 toward the measurement range and transforms the first outgoing laser beam L1 so as to generate a predetermined projection pattern that covers a larger cross sectional area than the cross sectional area of the collimated outgoing laser beam L0 by the optical lens 60. The incident laser beam to the flat reflecting portion 411 is the laser beam of parallel rays collimated by the optical lens 60. The incident laser beam is dispersed such that the diameter of the first outgoing laser beam L1 is increased by its reflection by the flat reflecting portion 411.

FIG. 11 is a graph showing an exemplary projection pattern P1 of the first outgoing light L1 generated by the flat reflecting portion 411 including the reflection type diffraction grating. The projection pattern P1 is similar to that in the first embodiment.

The projection pattern P1 is obtained when the apparatus 100B having the rotary device 400A is set on the horizontal plane, the first outgoing laser beam L1 exits from the apparatus 100B in the horizontal direction. Thus, if a vertical plane F is prepared in the measuring range, and the first outgoing laser beam L1 is incident on the vertical plane F, the distribution of intensity of the first outgoing laser beam L1 has a circular shape, as shown in FIG. 11.

In FIG. 11, the ring-shaped projection pattern P1 generated by the flat reflecting portion 411 is shown. The ring-shaped projection pattern P1 includes a dark area A1 and a bright area A2, wherein a greater intensity of light shines upon the bright area A2 than the dark area A1. The reflection type diffraction grating of the flat reflecting portion 411 plays the role of an optical element.

The laser radar apparatus 100B according to the present embodiment has the same advantages achieved by the previous embodiment. The laser radar apparatus 100B further has the flat reflecting portion 411 of the concave mirror 410 including the reflection type diffraction grating. The flat reflecting portion 411 positioned on the axis of the outgoing laser beam L0 between the laser diode 10 and the measurement range. The first outgoing laser beam L1 is reflected by the flat reflecting portion 411 of the concave mirror 410 and is transformed so as to have a predetermined projection pattern that covers a larger cross sectional area than the cross sectional area of the collimated outgoing laser beam L0 by the optical lens 60. Hence, the distribution of the incoming laser beam L3 reflected back by the object can be designed to prevent the incoming laser beam L3 entering the through-hole 32. Therefore, loss or attenuation of the incoming laser beam L3 caused during traveling through the mirror assembly 300 is effectively reduced.

Further, in the laser radar apparatus 100B, the concave mirror 402 deflects the first outgoing laser beam L1 toward the measurement range outside the apparatus 100B and deflects the incoming laser beam L3 from the object located in the measurement range, if it exists, toward the mirror 30. Thus, the laser radar apparatus 100B according to the present embodiment has improved beam splitting efficiency and improved accuracy of detecting the direction and the distance to an object without sacrificing the small size of the laser radar apparatus. Further, the concave mirror 410 has the flat reflecting portion 411 that has the flat mirror surface 411a that is configured such that the first outgoing laser beam L1 enters to and is deflected by the flat mirror surface 411a. Thus, it is possible to prevent from causing beam diffusion during the outgoing laser beam L0 being reflected by the concave mirror 410. Therefore, the laser radar apparatus 100B has improved beam splitting efficiency and improved accuracy of detecting the direction and the distance to an object.

Further, in the present embodiment, the flat reflecting portion 411 includes the reflection type diffraction grating that transforms the laser beam to have the predetermined projection pattern. In this configuration, optical elements such as the optical element 1000 shown in FIG. 1 are unnecessary. Thus, it is possible to reduce the size of the laser radar apparatus. Therefore, the laser radar apparatus 100B according to the present embodiment has improved beam splitting efficiency and improved accuracy of detecting the direction and the distance to an object without sacrificing the small size of the laser radar apparatus.

Further, the flat reflecting portion 411 includes the reflection type diffraction grating to generate the predetermined projection pattern of the first outgoing laser beam L1. In the flat reflecting portion 411, the incident laser beam is dispersed such that diameter of the first outgoing laser beam L1 is increased. Hence the irradiated area on a target surface F of the object located in the measurement range is also enlarged comparing with the case where the reflection type diffraction grating is not included. The beam transforming means includes the flat reflecting portion 411. Therefore the functions of the beam transforming means can be easily and reliably realized by the flat reflecting portion 411.

The predetermined projection pattern P1 of the first outgoing laser beam L1 includes a dark area A1 and a bright area A2, wherein a higher intensity of light shines upon the bright area A2 than the dark area A1. Thus, the mirror assembly 300 can reduce the loss of the incoming laser beam L3 caused by the incoming laser beam L3 entering the through-hole 32. Therefore, the laser radar apparatus 100B has improved beam splitting efficiency and improved accuracy of detecting the direction and the distance to an object.

Further, in the laser radar apparatus 100B according to the present embodiment, the same advantages with the previous embodiment can be obtained.

Third Embodiment

Figure 12:
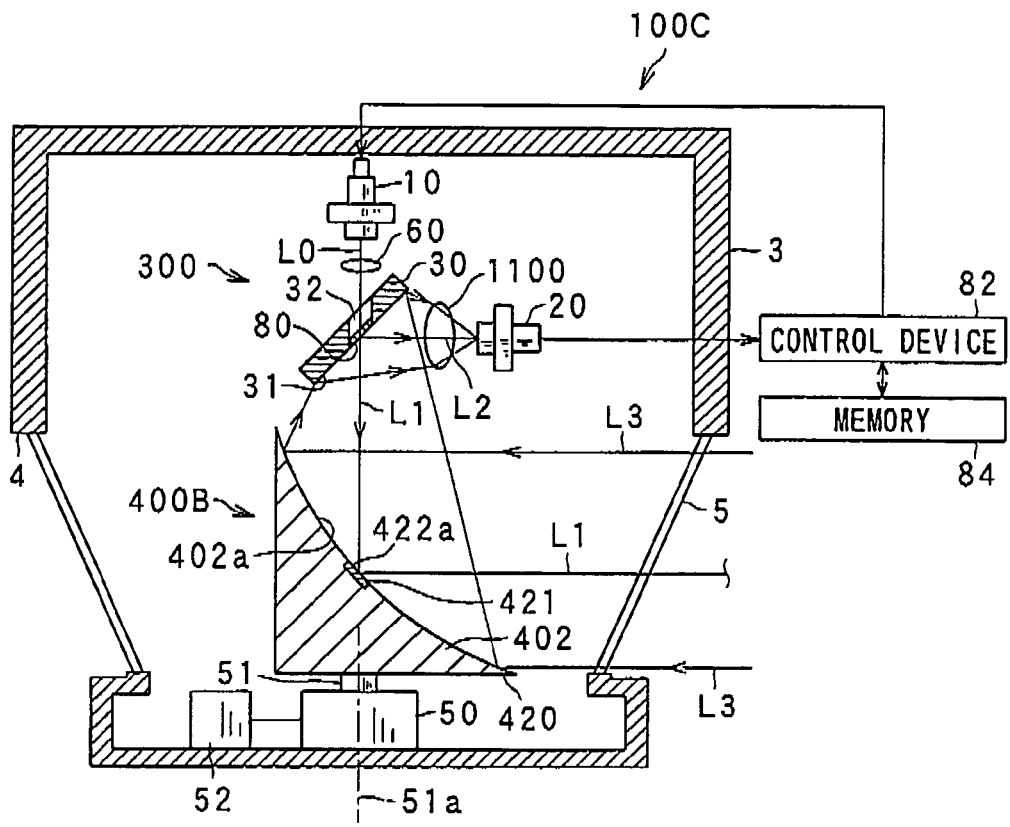
FIG. 12 is a schematic view of a laser radar apparatus according to a third embodiment of the present invention.
Figure 13:
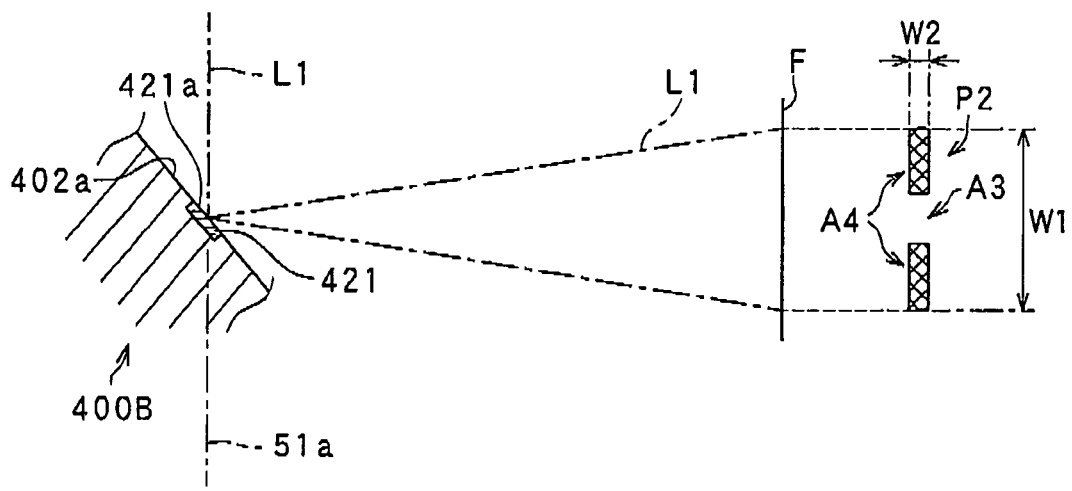
FIG. 13 is a graph illustrating a projection pattern of outgoing light transmitted through beam transforming means and deflected by a flat reflecting portion according to the third embodiment.

Referring to FIGS. 12-13, a laser radar apparatus according to a third embodiment of the present invention will be described.

FIG. 12 is a schematic view of the laser radar apparatus 100C according to the third embodiment of the present invention.

In the present embodiment, the differences from the second embodiment are based on the different structure of a rotary device 400B from the rotary device 400B because the rotary device 400B includes a concave mirror 420 that is different from the concave mirror 410. Thus, the detailed discussion about the constituents of the laser radar apparatuses having the same function and the structure with those used in the previous embodiments will be omitted.

The laser radar apparatus 100C has a rotary device 400B having a concave mirror 420. The concave mirror 420 has a concave reflecting portion 402 that has the concave-shaped mirror surface 402a and a flat reflecting portion 421 that has a flat mirror surface 421a. The reflecting portion 402 has already disclosed in the first embodiment. The concave-shaped mirror surface 402a of the concave reflecting portion 402 encloses the flat mirror surface 421a of the flat reflecting portion 421. The flat mirror surface 421a of the flat reflecting portion 421 is positioned on the axis of the outgoing laser beam L0 that is emitted from the laser diode 10. In more detail, the first outgoing laser beam L1 that is collimated to a laser pulse of parallel rays is dispersed by the half-silvered mirror 80, and then strikes the flat mirror surface 421a.

As in the case of the first embodiment, the laser radar apparatus 100C is designed to detect the direction and the distance from the apparatus to an object, if it exists, based on the difference of the phases of outgoing light emitted by the laser diode 10 via the half-silvered mirror 80 and a flat mirror surface 421a, and incoming light that is reflected back by the object and received by the photo diode 20 via the concave-shaped mirror surface 402a and the half-silvered mirror 80, or the time of flight between the emission and reception of a light pulse utilizing the speed of light. In this embodiment, the laser diode 10 emits light pulses.

The laser radar apparatus 100C includes a projection optical system and a photo detecting system. The concave mirror 410 further includes the concave reflecting portion 402 that has the concave-shaped mirror surface 402a and the flat reflecting portion 411 that has the flat mirror surface 411a. The flat reflecting portion 411 serves as an optical element.

In the present embodiment, the projection optical system includes the laser diode 10 serving as the elements of the laser beam generating means, the motor 50 serving as the rotation driving means, the optical lens 60 serving as the laser beam collimating means, the mirror assembly 300, and the concave mirror 420 serving as the light deflecting means and the photo detecting system including the concave mirror 420 serving as the light deflecting means, the mirror assembly 300, the photo diode 20 serving as the element of the photo detecting means, and the motor 50 serving as the rotation driving means. The mirror assembly 300 includes the mirror 30 that serves as the laser beam isolating means and the half-silvered mirror 80 that serves as the beam splitting means. The laser diode 10 emits the outgoing laser beam L0.

As in the case of the first embodiment, the mirror assembly 300 has the mirror 30 and the half-silvered mirror 80. The mirror 30 is arranged at a predetermined angle, for example, at an angle of about 45 degrees with respect to the axis of the outgoing laser beam L0. Further, the mirror 30 has the through-hole 32 through which the outgoing laser beam L0 passes without any loss of the intensity thereof. The through-hole 32 is at least partially covered by the half-silvered mirror 80. Further, the mirror 30 has the reflection plate 31 that reflects the incoming laser beam L3 toward the photo diode 20. The outgoing laser beam L0 enters the through-hole 32 of the mirror 30, although the incoming laser beam L3 is deflected by the mirror 30. The mirror 30 is substantially formed as a plate having two surfaces. The mirror 30 has the reflection plane 31 which corresponds to one of the surfaces of the mirror 30 and the half-silvered mirror 80. The reflection plane 31 is arranged at a predetermined angle to the axis of outgoing laser beam L0. The mirror 30 is substantially formed as a plate having two surfaces. The mirror 30 has a reflection plane 31 which corresponds to one of the surfaces of the mirror 30. The reflection plane 31 is arranged at a predetermined angle to the axis of outgoing laser beam L0. The through-hole 32 has a center axis thereof and pierces the mirror 30 such that the center axis of the through-hole 32 crosses a surface of the reflection plate 31. The half-silvered mirror 80 of the mirror assembly 300 splits the outgoing laser beam L0 into a first outgoing laser beam L1 and a second outgoing laser beam L2. The directions of the first outgoing laser beam L1 and the second outgoing laser beam L2 are different from each other. The first outgoing laser beam L1 has the same optical path as the outgoing laser beam L0 of the first embodiment. That is, the first outgoing laser beam L1 enters to the concave mirror 420.

Further, the cover case 3 is provided to house the laser diode 10, the photo diode 20, the mirror assembly 300, the optical lens 60, and the rotary device 400B. The cover case 3 has an optical window 4 through which the first outgoing laser beam L1 and the incoming laser beam L3 emitted from and enters into the apparatus 100B, respectively. The optical window 4 is covered by a transparent plate 5 such as a transparent glass in order to prevent the concave mirror 420 and other elements of the apparatus 100 from being exposed to dust, as in the apparatus 100B according to the first embodiment disclosed above.

Further, the second outgoing laser beam L2 dispersed by the half-silvered mirror 80 is directed to the photo diode 20 and is detected by the photo diode 20 to measure the intensity thereof. The intensity of the second outgoing laser beam L2 detected by the photo diode 20 is correlated to that of the outgoing laser beam L0 emitted from the laser diode 10. Using this fact, the feedback control of the laser diode 10 is carried out by the control device 82, and the memory 84.

Further, similar to the case of the first embodiment, the rotary device 400B is arranged to be rotatable around a rotation axis which is identical with the axis of the outgoing laser beam L0 using the motor 50, so that an angular scanning range in the horizontal direction can be realized to be of up to 360 degrees. The rotary device 400B includes the concave mirror 420 that deflects the first outgoing laser beam L1 toward the measurement range and the incoming laser beam L3 (reflected back by the object) toward the mirror 30. The concave mirror 420 has a focal point on the rotation axis of the rotary device 400.

In order to drive the rotary device 400B to execute the continuous rotating movement, the motor 50 is provided. The motor 50 has the output shaft 51 that drives the rotary device 400A and the concave mirror 410. The motor 50 corresponds to rotation driving means. In order to detect the rotation angle of the motor 50, a rotation angle sensor 52 is provided and is connected to the motor 50.

The rotary device 400B has a rotation axis 51a that is defined as the axis of the output shaft 51 of the motor 50. The rotation axis 51a is aligned with the axis of the outgoing laser beam L0 and the first outgoing laser beam L1 between the laser diode 10 and the concave mirror 541. The concave reflecting portion 543 of the concave mirror 420 has a focal point on the rotation axis 51a of the rotary device 400B. Hence, after the incoming laser beam L3 reflected back by the object is reflected by the concave reflecting portion 343 of the concave mirror 420, the incoming laser beam L3 is collected to the focal point positioned on the rotation axis 51a.

Further, in the laser radar apparatus 100C according to the present embodiment, the flat reflecting portion 421 of the concave mirror 420 includes a reflection type diffraction grating. The flat reflecting portion 421 deflects the first outgoing laser beam L1 emitted from the laser diode 10 and transmitted through the half-silvered mirror 80 toward the measurement range and transforms the outgoing laser beam L0 so as to generate a predetermined projection pattern that covers a larger cross sectional area than the cross sectional area of the collimated outgoing laser beam L0 by the optical lens 60. The incident laser beam which was collimated by the optical lens 60 to the flat reflecting portion 421 is the laser beam of parallel rays. The incident laser beam is dispersed such that diameter of the first outgoing laser beam L1 is increased by its reflection by the flat reflecting portion 421.

FIG. 13 is a graph showing an exemplary projection pattern P2 of the first outgoing light L1 generated by the flat reflecting portion 421 including the reflection type diffraction grating. The projection pattern P2 is different form the projection pattern P1.

The projection pattern P1 is obtained when the apparatus 100C having the rotary device 400B is set on the horizontal plane, the first outgoing laser beam L1 exits from the apparatus 100C in the horizontal direction. Thus, if a vertical plane F is prepared in the measuring range, and the first outgoing laser beam L1 is incident on the vertical plane F, the distribution of intensity of the first outgoing laser beam L1 has a rectangular shape, as shown in FIG. 15.

As shown in FIG. 13, the projection pattern P2 has three rectangular areas in a vertical direction parallel to the rotation axis 51a. Thus, the projection pattern P2 has the shape of a long narrow rectangle having a longer edge and a shorter edge. That is, the projection pattern P2 has a dark area A3 and a pair of bright areas A4. The dark area A3 is sandwiched between the pair of the bright areas A4. The length of the longer edge W1 is longer than the length of the shorter edge W2, as shown in FIG. 13. The reflection type diffraction grating of the flat reflecting portion 421 plays the role of an optical element.

In the laser radar apparatus 100C according to the present embodiment, the same advantages with the previous embodiments can be obtained. Further, the flat reflecting portion 421 transforms the injection laser beam to have the projection pattern P2. The projection pattern P2 has the pair of the bright areas A4 and the dark area A3 that is sandwiched between the pair of the bright areas A4. Thus, the mirror assembly 300 can reduce the loss of incoming laser beam L3 generated by the incoming laser beam L3 injecting the through-hole 32. Therefore, the laser radar apparatus 100C has improved beam splitting efficiency and improved accuracy of detecting the direction and the distance to an object.

Further, the projection pattern P2 has the shape of the long narrow rectangle having the longer edge parallel to the rotation axis 51a, and has the pair of the bright areas A4 that sandwich the dark area A3 in the direction parallel to the rotation axis 51a. Thus, it is possible to improve the resolution of the direction of the object.

(Modification of the Embodiments)

While the present invention has been disclosed in terms of the preferred embodiment in order to facilitate a better understanding thereof, it should be appreciated that the invention can be embodied in various ways without departing from the principle of the invention.

For example, in the first, second, and third embodiments, the optical lens 60 is provided between the laser diode 10 and the mirror 30. The optical lens 60 corresponds to the laser beam collimating means. However, it is possible to remove the optical lens 60. In this case, the outgoing laser beam L0 passes through the through-hole 32. Further, it is preferable that the optical lens 60 includes a collective lens.

Further, in the first and second embodiments, the through-hole 32 of the mirror is designed such that the projected image of the through-hole 32 has the circular shape, if the through-hole 32 is projected to a plane perpendicular to the axis of the outgoing laser beam L0. However, it is allowed that the projected image of the through-hole 32 has a rectangular shape or other shapes.

Further, in all the embodiments disclosed above, the through-hole 32 is at least partially covered by the half-silvered mirror 80. However, it is possible to omit the half-silvered mirror 80. That is, the through-hole 32 is empty in this case.

Further, in the first embodiment, the optical element 1000 is provided on the optical path of the outgoing laser beam L0. However, it is possible to omit the optical element 1000. In this case, the outgoing laser beam L0 is not transformed to have any predetermined projection pattern, but is the laser beam or pulses of parallel rays.

What is claimed is:

1. A laser radar apparatus that measures the distance of an object and the direction to the object, the object being located in a measurement range from the laser radar apparatus, comprising:

laser beam generating means for generating a laser beam having an axis thereof and emitting the laser beam toward the measurement range;

photo detecting means for detecting a reflected laser beam that is reflected back by the object located in the measurement range;

a mirror assembly comprising:
a through-hole that pierces the mirror assembly being coaxial with the axis of the laser beam emitted from the laser beam generating means and transmits the laser beam emitted from the laser beam generating means; and
a reflecting surface that is arranged to be at a predetermined angle to the axis of the laser beam emitted from the laser beam generating means and reflects a reflected laser beam reflected back by the object toward the photo detecting means;

light deflecting means for deflecting the laser beam emitted from the laser beam generating means and deflecting the laser beam reflected back by the object located in the measurement range, the light deflecting means having a rotation axis and a focal point thereof and comprising a mirror surface including a flat reflecting portion having a flat mirror surface and a concave reflecting portion having a concave-shaped mirror surface;

rotation driving means for rotating the light deflecting means around the rotation axis of the light deflecting means such that both the concave-shaped mirror surface of the concave reflecting portion and the flat mirror surface of the flat reflecting portion of the light deflecting means are turned to be in the direction of the measurement range, wherein the focal point of the light deflecting means is located on the rotation axis of the light deflecting means, and the light deflecting means deflects the laser beam emitted from the laser beam generating means toward the measurement range and deflecting the laser beam reflected back by the object located in the measurement range toward the mirror assembly.

2. The apparatus according to claim 1, further comprising:
laser beam collecting means for collecting the laser beam reflected back by the object to the photo detecting means.

3. The apparatus according to claim 1, wherein
the flat mirror surface of the flat reflecting portion of the light deflecting means is enclosed by the concave-shaped mirror surface of the concave reflecting portion.

4. The apparatus according to claim 1, wherein:
a peripheral surface of the through-hole has a projected image that is obtained by the peripheral surface of the through-hole projecting a plane perpendicular to the axis of the laser beam emitted from the laser beam generating means, and the peripheral surface of the through-hole has in the shape of almost circle, and an outer edge of the flat mirror surface of the flat reflecting portion has projected images that obtained by the outer edge of the flat mirror surface of the flat reflecting portion projecting the plane perpendicular to the axis of the laser beam emitted from the laser beam generating means, and the outer edge of the flat mirror surface of the flat reflecting portion have in the shape of almost circle.

5. The apparatus according to claim 1, further comprising:
beam transforming means for transforming the laser beam emitted from the laser beam generating means to a transferred laser beam having a predetermined projection pattern, wherein the beam transforming means is embedded in the flat mirror surface portion of the surface of the light deflecting means such that the laser beam emitted from the laser beam generating means is transformed to have the predetermined projection pattern in the measurement range and the cross section of the transferred laser beam covers larger area than the cross sectional area of the laser beam emitted from the laser beam generating means.

6. The apparatus according to claim 5, wherein
the beam transforming means includes a diffraction grating.

7. The apparatus according to claim 5, wherein
the predetermined projection pattern includes a bright area and a dark area enclosed by the bright area, wherein a greater quantity of light shines upon the bright area than the dark area.

8. The apparatus according to claim 5, wherein
the predetermined projection pattern includes a pair of bright areas and a dark area put between the pair of the bright areas.

9. The apparatus according to claim 8, wherein
the predetermined projection pattern is designed such that the pair of bright areas are located on the rotation axis of the deflecting means with a predetermined spacing.

* * * * *